(12) United States Patent
Thiessen et al.

(10) Patent No.: US 7,059,210 B2
(45) Date of Patent: Jun. 13, 2006

(54) SIX SPEED MOTORCYCLE TRANSMISSION

(75) Inventors: James R. Thiessen, Somis, CA (US); David J. Whitaker, Camarillo, CA (US); Christopher A. Jenkins, Thousand Oaks, CA (US)

(73) Assignee: Thiessen Products Inc., Camarillo, CA (US)

( * ) Notice: Subject to any disclaimer, the term of this patent is extended or adjusted under 35 U.S.C. 154(b) by 37 days.

(21) Appl. No.: 10/764,086

(22) Filed: Jan. 23, 2004

(65) Prior Publication Data

US 2005/0160848 A1 Jul. 28, 2005

(51) Int. Cl.
*F16H 59/00* (2006.01)

(52) U.S. Cl. .................................... 74/337.5

(58) Field of Classification Search ........... 74/337.5, 74/325, 333
See application file for complete search history.

(56) References Cited

U.S. PATENT DOCUMENTS

| | | | | |
|---|---|---|---|---|
| 2,660,070 A | * | 11/1953 | Magis | 74/337.5 |
| 4,491,031 A | * | 1/1985 | Ooka | 74/337.5 |
| 4,515,038 A | * | 5/1985 | Tsuboi | 74/606 R |
| 5,542,309 A | * | 8/1996 | Wenger et al. | 74/337.5 |
| 5,704,251 A | * | 1/1998 | Alber et al. | 74/473.25 |
| 6,155,125 A | | 12/2000 | Negherbon et al. | |

* cited by examiner

*Primary Examiner*—Dirk Wright
(74) *Attorney, Agent, or Firm*—Christie, Parker & Hale, LLP.

(57) ABSTRACT

A six speed gear assembly for a motorcycle transmission is provided that includes a mainshaft gear shaft with a plurality of mainshaft gears mounted in sequence thereon, wherein the sequence includes a mainshaft 4th gear, a mainshaft 3rd gear, one of a mainshaft 1st gear and a mainshaft 2nd gear, the other of the mainshaft 1st gear and the mainshaft 2nd gear, a mainshaft 6th gear, and a mainshaft 5th gear. The six speed gear assembly also includes a countershaft gear shaft with a plurality of countershaft gears mounted in sequence thereon, wherein the sequence includes a countershaft 4th gear, a countershaft 3rd gear, one of a countershaft 1st countershaft 1st gear and a countershaft 2nd gear, the other of the countershaft 1st gear and the countershaft 2nd gear, a countershaft 6th gear, and a countershaft 5th gear.

56 Claims, 20 Drawing Sheets

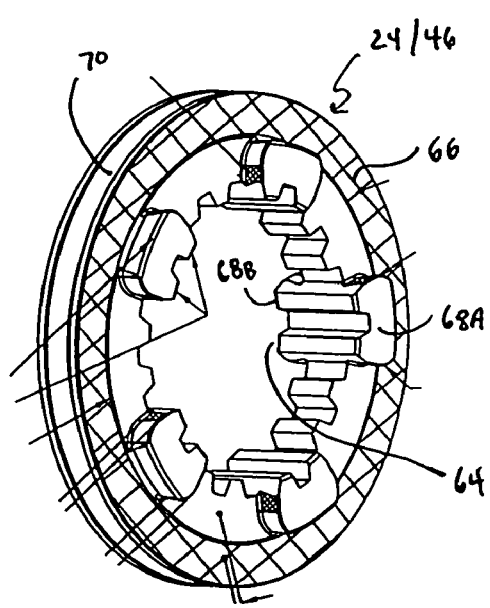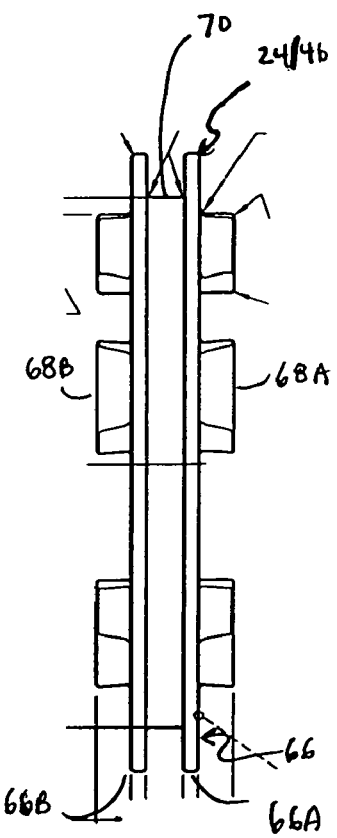
FIG. 3A
FIG. 3B
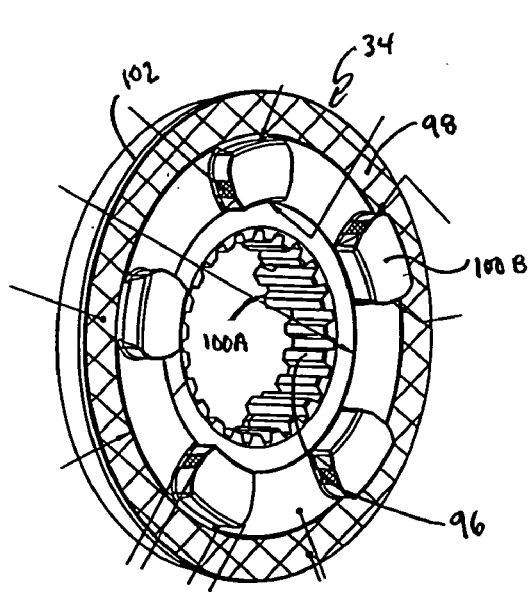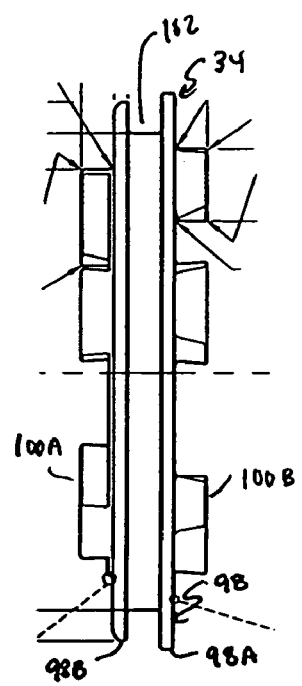
FIG. 4A
FIG. 4B

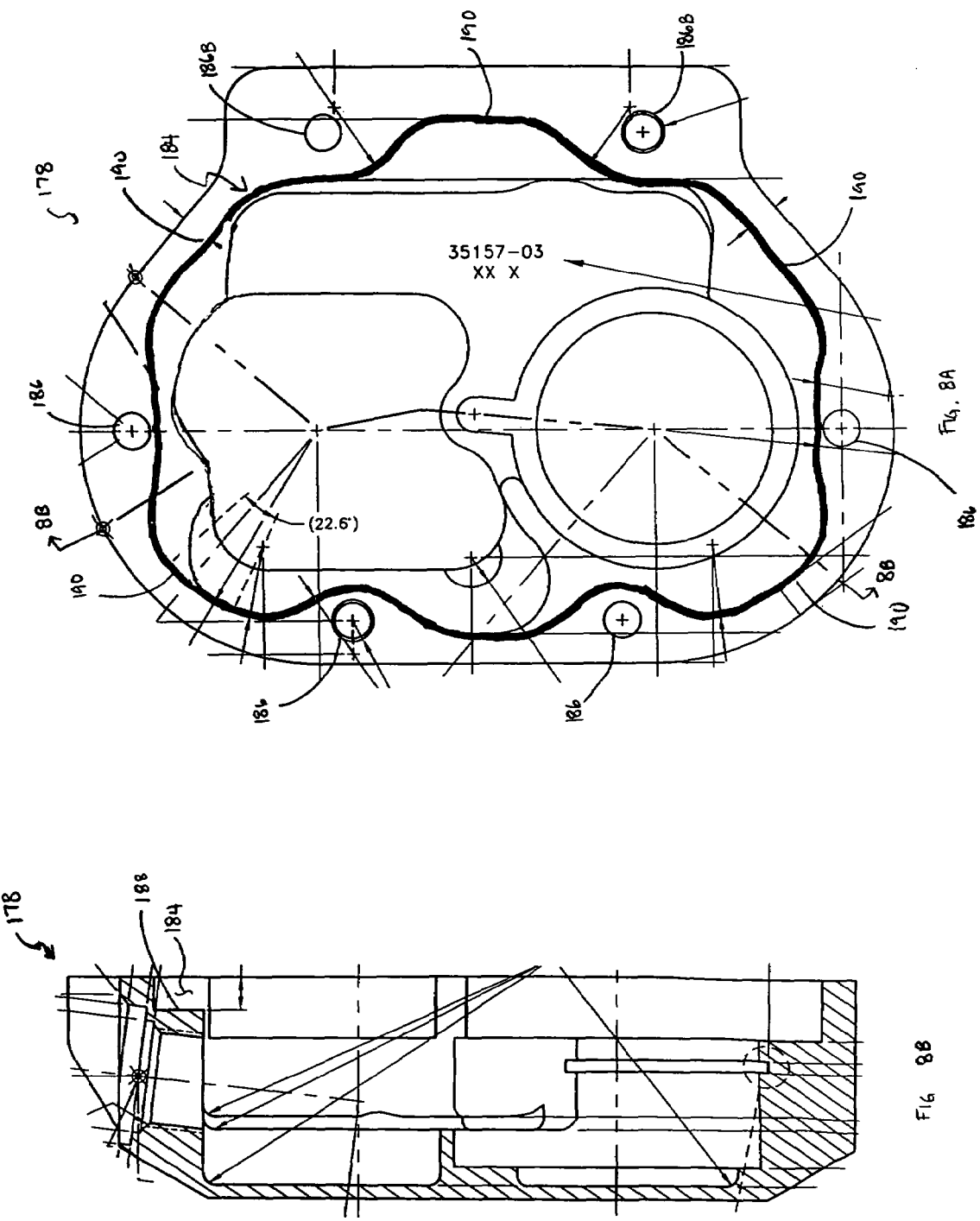

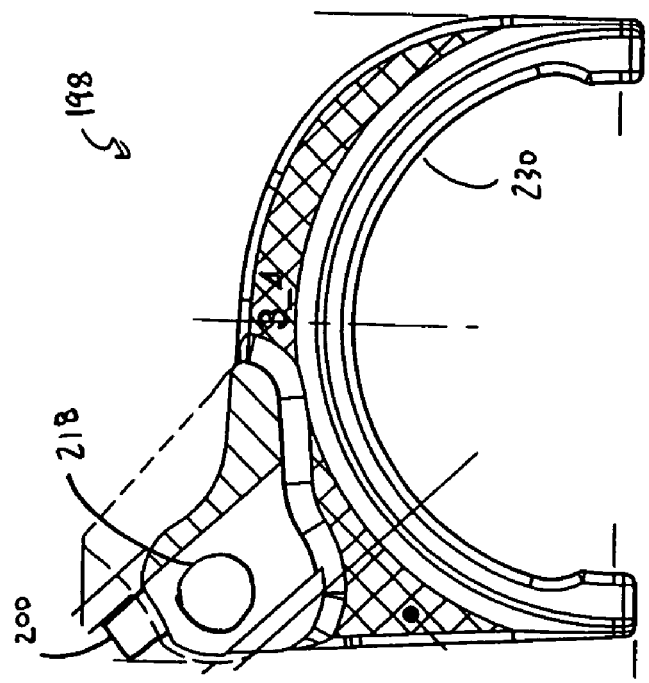
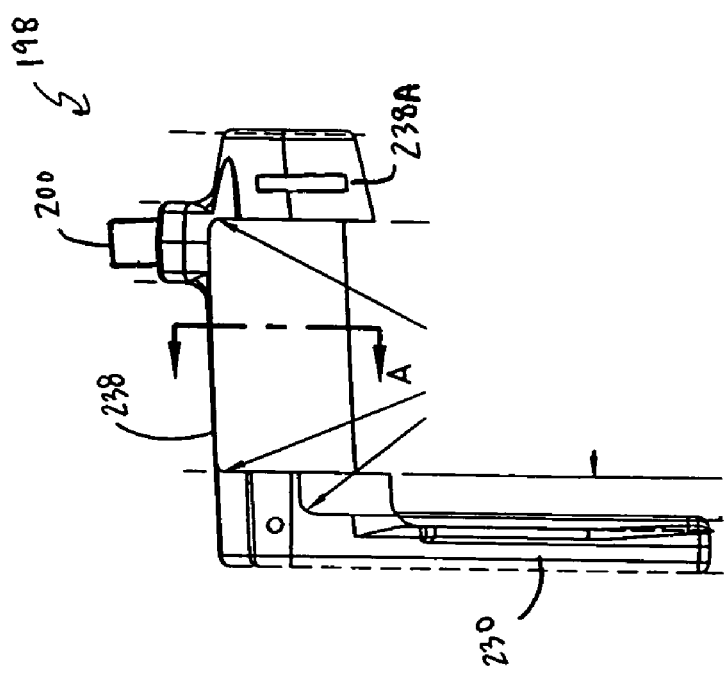

SIX SPEED MOTORCYCLE TRANSMISSION

FIELD OF THE INVENTION

The present invention relates generally to a six speed gear assembly and/or components related thereto for use in a six speed transmission case. Alternatively or in addition, the present invention relates generally to a six speed gear assembly and/or components related thereto for retrofitting to a five speed transmission case.

BACKGROUND OF THE INVENTION

It is often desirable to remove a stock Harley Davidson® five speed motorcycle transmission from a Harley Davidson® motorcycle and replace the it with a six speed transmission to convert the motorcycle from a five speed transmission to a six speed transmission. For ease of installation, it is desirable to mount a six speed gear assembly into an existing stock Harley Davidson® five speed transmission case to convert the transmission from a five speed transmission to a six speed transmission.

However, since the stock Harley Davidson® five speed transmission case is designed to receive a stock Harley Davidson® five speed gear assembly, conventional six speed gear assemblies do not fit into the stock Harley Davidson® five speed transmission case. Accordingly, a need exists for a six speed gear assembly and/or components related thereto that may be mounted in a stock Harley Davidson® five speed transmission case. A need also exists for a six speed gear assembly and/or components related thereto that may be mounted in a stock Harley Davidson® five speed transmission without modifying the outer dimensions of the stock Harley Davidson® five speed transmission case and without modifying the motorcycle exhaust.

SUMMARY

In one embodiment, the present invention is a six speed gear assembly for a motorcycle transmission that includes a mainshaft gear shaft with a plurality of mainshaft gears mounted in sequence thereon, wherein the sequence includes a mainshaft 4th gear, a mainshaft 3rd gear, one of a mainshaft 1st gear and a mainshaft 2nd gear, the other of the mainshaft 1st gear and the mainshaft 2nd gear, a mainshaft 6th gear, and a mainshaft 5th gear. The six speed gear assembly also includes a countershaft gear shaft with a plurality of countershaft gears mounted in sequence thereon, wherein the sequence includes a countershaft 4th gear, a countershaft 3rd gear, one of a countershaft 1st countershaft 1st gear and a countershaft 2nd gear, the other of the countershaft 1st gear and the countershaft 2nd gear, a countershaft 6th gear, and a countershaft 5th gear.

In another embodiment, the present invention is a six speed gear assembly for a motorcycle transmission that includes a mainshaft gear shaft having a plurality of mainshaft gears mounted thereon, wherein the plurality of mainshaft gears includes 1st, 2nd, 3rd, 4th, 5th and mainshaft 6th gears. The six speed gear assembly also includes a countershaft gear shaft having a plurality of countershaft gears mounted thereon, wherein the plurality of countershaft gears includes 1st, 2nd, 3rd, 4th, 5th and countershaft 6th gears. Each mainshaft gear meshes with a corresponding countershaft gear to form a plurality of gear couplings. One of the gears from each gear coupling is rotatably coupled to its corresponding gear shaft and the remaining gear from each gear coupling is non-rotatably coupled to its corresponding gear shaft. Each rotatably coupled gear includes pockets that removably engage dogs that protrude from one of a plurality of shift rings, and wherein each shift ring is non-rotatably coupled to a corresponding one of the gear shafts.

In yet another embodiment, the present invention is a method of retrofitting a six speed motorcycle transmission to a stock Harley Davidson® five speed transmission case, wherein the stock case includes a central portion, a first side wall adjacent to a first side of the central portion, and a stock trapdoor adjacent to a second side of the central portion, and wherein the central portion includes a top surface and a central portion opening. The method includes removing the stock trapdoor; providing a six speed gear assembly having a mainshaft gear shaft and a countershaft gear shaft; mounting a plurality of mainshaft gears on the mainshaft, wherein the plurality of mainshaft gears includes mainshaft 1st, 2nd, 3rd, 4th, 5th and 6th gears; and mounting a plurality of countershaft gears on the countershaft, wherein the plurality of countershaft gears includes countershaft 1st, 2nd, 3rd, 4th, 5th and 6th gears. Each mainshaft gear meshes with a corresponding countershaft gear to form a plurality of gear couplings. The method also includes securing the six speed gear assembly to a replacement trapdoor. The replacement trapdoor includes a recess that receives at least a portion of the thickness of one of the gear couplings. The method also includes securing the replacement trapdoor and the six speed gear assembly to the stock case.

In still another embodiment, the present invention is a trapdoor for retrofitting to a stock Harley Davidson® five speed transmission case, that includes a trapdoor base; and a recess in the trapdoor base for receiving at least a portion of the thickness of a gear from a six speed gear assembly.

In still yet another embodiment, the present invention is a trapdoor for a motorcycle transmission that includes a trapdoor base; and a recess in the trapdoor base for receiving at least a portion of the thickness of a gear from a transmission gear assembly.

In a further embodiment, the present invention is a trapdoor and end cover combination for a motorcycle transmission that includes a trapdoor base having a protrusion extending therefrom; and an end cover base having a recess formed therein, wherein the protrusion of the trapdoor mates with the recess in the end cover to prevent a rotational movement of the trapdoor relative to the end cover.

In a still further embodiment, the present invention is a transmission assembly that includes a six speed gear assembly having a mainshaft gear shaft and a countershaft gear shaft. A plurality of mainshaft gears are mounted on the mainshaft. The plurality of mainshaft gears includes mainshaft 1st, 2nd, 3rd, 4th, 5th and 6th gears. A plurality of countershaft gears are mounted on the countershaft. The plurality of countershaft gears includes countershaft 1st, 2nd, 3rd, 4th, 5th and 6th gears. Each mainshaft gear meshes with a corresponding countershaft gear to form a plurality of gear couplings. The transmission assembly also includes a trapdoor having a recess that receives at least a portion of the thickness of one of the gear couplings.

BRIEF DESCRIPTION OF THE DRAWINGS

Novel features and advantages of the present invention will be better understood by reference to the following detailed description when considered in conjunction with the accompanying drawings wherein:

FIGS. 3A and 3B are perspective and side views, respectively, of a shift ring for use with the six speed gear assembly according to an exemplary embodiment of the present invention;

FIGS. 4A and 4B are perspective and side views, respectively, of another shift ring for use with a six speed gear assembly according to an exemplary embodiment of the present invention;

FIGS. 8A and 8B are side and cross-sectional views, respectively, of the end cover of FIG. 2;

FIGS. 11A and 11B are side and front views, respectively, of an exemplary shift fork according to another aspect of the invention for use with a shift assembly according to an exemplary embodiment of the present invention;

DETAILED DESCRIPTION OF THE INVENTION

As shown in FIGS. 2–23C, the present invention is directed to a six speed gear assembly and/or components related thereto for use in a six speed transmission case. Alternatively or in addition, the present invention is directly to a six speed gear assembly and/or components related thereto for retrofitting to a five speed transmission case.

Figure 1:
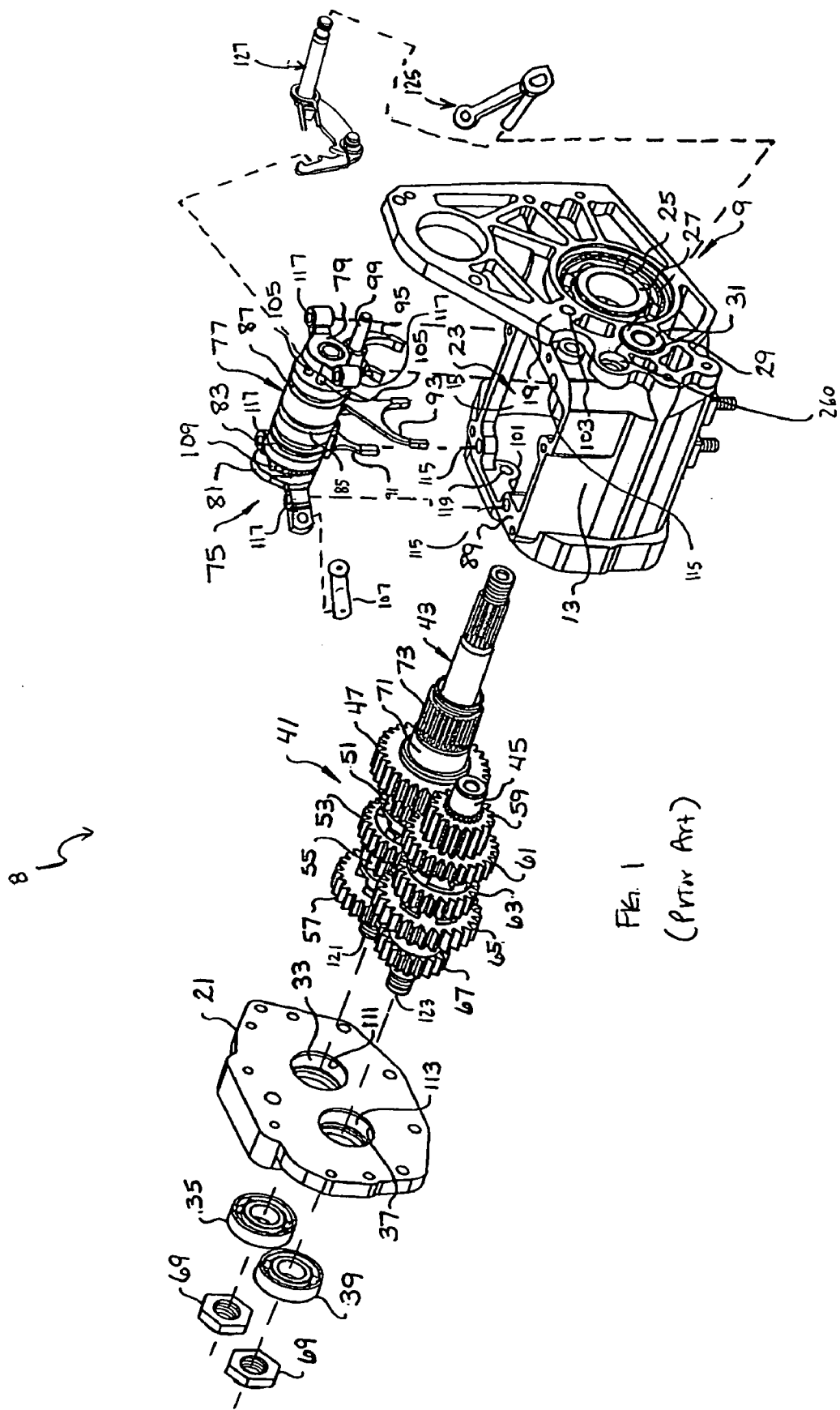
FIG. 1 is an exploded perspective view of a stock Harley Davidson® five speed motorcycle transmission according to the prior art.

FIG. 1 shows the major components of a stock Harley Davidson® five speed transmission 8. Many of the smaller components of the transmission 8, which are well known to those skilled in the art, are not shown for clarity. The transmission 8 includes a stock Harley Davidson® five speed transmission case 9. The transmission case 9 includes a central portion 13, a first side wall 19 (hereinafter side wall 19), and a removable second side wall or trapdoor 21 (sometimes referred to as a bearing housing assembly, and hereinafter referred to as trapdoor 21.) The central portion 13, the side wall 19 and the trapdoor 21 together define a cavity 23. The central portion 13 also has an central portion opening 15.

A first recess 25 in the side wall 19 receives a mainshaft case bearing 27, and a second recess 29 in the side wall 19, adjacent to the first recess 25, receives a countershaft case bearing 31. The mainshaft case bearing 27 is pressed against a shoulder (not shown) of the first recess 25 and held thereagainst by a snap ring (not shown). The countershaft case bearing 31 is press fit in the second recess 29 of the side wall 19.

A first recess 33 in the trapdoor 21 receives a mainshaft trapdoor bearing 35, and a second recess 37 in the trapdoor 21, adjacent to the first recess 33, receives a countershaft trapdoor bearing 39. The mainshaft trapdoor bearing 35 is pressed against a shoulder 111 of the first recess 33 and held thereagainst by a snap ring (not shown). Similarly, the countershaft trapdoor bearing 39 is pressed against a shoulder 113 of the second recess 37 and held thereagainst by a snap ring (not shown).

FIG. 1 also shows a stock Harley Davidson® five speed gear assembly 41. The five speed gear assembly 41 includes a mainshaft 43 and a countershaft 45. The mainshaft 43 has mounted thereto, a mainshaft 5th gear 47, a mainshaft 2nd gear 51, a mainshaft 3rd gear 53, a mainshaft 1st gear 55 and a mainshaft 4th gear 57. Similarly, the countershaft 45 has mounted thereto, a countershaft 5th gear 59, a countershaft 2nd gear 61, a countershaft 3rd gear 63, a countershaft 1st gear 65 and a countershaft 4th gear 67. Some of the components of the five speed gear assembly 41, such as split case bearings, retaining rings, thrust washers, and spacers, are not shown for clarity.

To install the five speed gear assembly 41 into the five speed transmission case 9, the mainshaft 43 and the countershaft 45 are secured to the trapdoor 21, such as by hex nuts 69 that engage threaded second ends 121 and 123 of the mainshaft 43 and the countershaft 45, respectively. The mainshaft trapdoor bearing 35 supports the second end of mainshaft 43 and the countershaft trapdoor bearing 39 supports the second end of countershaft 64. The trapdoor 21, with the five speed gear assembly 41 secured thereto, is fastened to the transmission case 9 by conventional fasteners (not shown).

When the five speed gear assembly 41 is installed into the transmission case 9, an outer bearing surface 71 of the mainshaft 5th gear 47 is supported by the mainshaft case bearing 27. An outer splined portion 73 of the mainshaft 5th gear 47 and the first end of mainshaft 43 protrude outside of the transmission case 9. The first end of the countershaft 45 is supported by the countershaft case bearing 31.

FIG. 1 also shows a shifting assembly 75. The shifting assembly 75 includes a shift drum 77 supported by first and second shift drum supports 79 and 81. The shift drum 77 includes grooves 83, 85 and 87 that for convenience have not been accurately depicted because they are well known. Shift forks 91, 93, and 95 are mounted in and guided by the shift drum grooves 83, 85 and 87, respectively.

The first and second shift drum supports 79 and 81 are mounted to a top surface 89 of the central portion 13 of the transmission case 9 by fasteners that extend through mounting collars 117 of the drum supports 79 and 81 and into mounting holes 115. With the shift drum supports 79 and 81 so mounted, the shift forks 91, 93 and 95 extend through central portion opening 15 and into transmission case cavity 23.

Each shift fork 91, 93 and 95 is supported within the cavity 23 by a shift fork shaft 99, which is mounted between an opening 119 in a shift fork shaft mounting flange 101, which extends downwardly from the top surface 89 of the central portion 13 of the transmission case 9, and an opening 103 defined by the side wall 19 of the transmission case 9.

Figure 2:
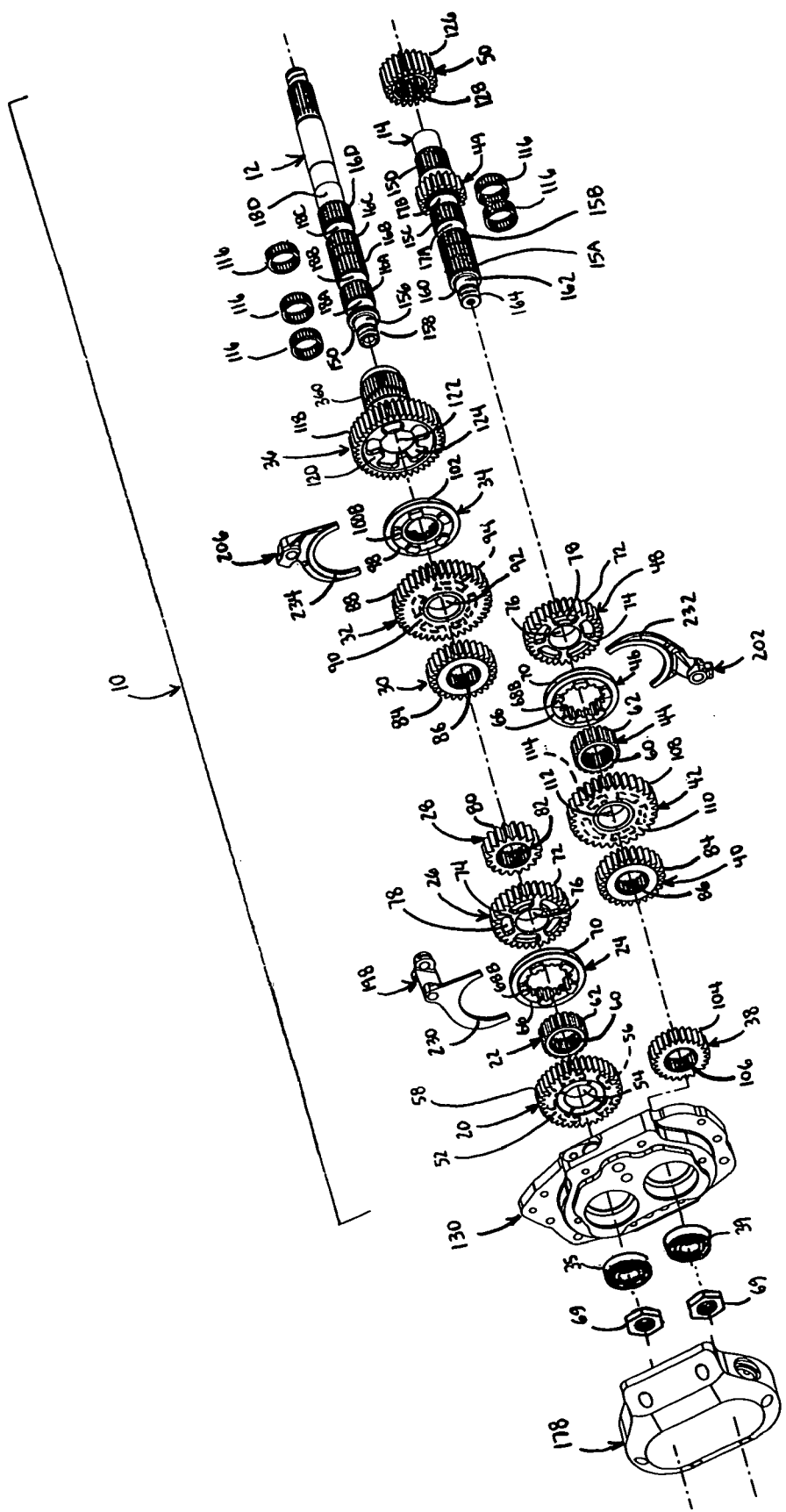
FIG. 2 is an exploded perspective view of an exemplary six speed gear assembly according to one aspect of the present invention as well as an exemplary trapdoor according to another aspect of the invention for receiving the six speed gear assembly and an exemplary end cover according to another aspect of the invention for attachment to the trapdoor.

In operation, when a shifter rod lever 125 rotates in response to a motorcycle operator actuating a shift pedal (not shown), a shift pawl 127 connected to the shifter rod lever 125 acts against shift pins 105 on the shift drum 77, causing the shift drum 77 to rotate. As the shift drum 77 rotates, an interaction of a detent follower 107 with a detent track 109, mounted to the shift drum 77, biases the shift drum 77 to predetermined angular positions. The rotation of the shift drum 96 to the predetermined angular positions causes one or more of shift forks 91, 93, and 95 to move axially along shift fork shaft 99 by action of the shift drum grooves 83, 85 and 87, respectively. Movements of the shift forks 91, 93, and 95 cause corresponding axial movements of gears along the mainshaft 43 and/or along the countershaft 45, causing a change in the gear ratio of the five speed gear assembly 41. FIG. 2 shows a six speed gear assembly 10 according to an exemplary embodiment of the invention. The six speed gear assembly 10 includes a mainshaft 12, a mainshaft 4th gear 20, a 3–4 spline sleeve 22, a 3–4 shift ring 24, a mainshaft 3rd gear 26, a mainshaft 1st gear 28, a mainshaft 2nd gear 30, a mainshaft 6th gear 32, a 5–6 shift ring 34, and a mainshaft 5th gear 36. The six speed gear assembly 10 also includes a countershaft 14, a countershaft 4th gear 38, a countershaft 3rd gear 40, countershaft 1st gear 42, a 1–2 spline sleeve 44, a 1–2 shift ring 46, a countershaft 2nd gear 48, a countershaft 6th gear 49 and a countershaft 5th gear 50. The exemplary six speed gear assembly 10 also includes split case bearings, retaining rings, thrust washers, and spacers, although, for clarity, not all these components are shown.

As shown in FIG. 2, the mainshaft 12 includes splined regions 16A, 16B, 16C and 16D and bearing regions 18A, 18B, 18C and 18D. An exemplary arrangement of the mainshaft gears on the mainshaft 12 and exemplary mainshaft gears are described below.

The mainshaft 4th gear 20 has teeth 58 that extend from a body portion 52. The body portion 52 has a generally smooth central opening 54 and a plurality of radially spaced pockets 56 recessed therein (see also FIGS. 5A–6B.) The central opening 54 is mounted on the bearings of a split cage bearing 116, which in turn is rotatably mounted on the bearing region 18A of the mainshaft 12. As such, the mainshaft 4th gear 20 is free to rotate with respect to the mainshaft 12 (i.e. rotatably mounted to the mainshaft 12.) In an exemplary embodiment, the mainshaft 4th gear 20 has a diametrical pitch of 12.7, 38 teeth and a thickness of approximately 0.661 inches.

The spline sleeve 22 is coupled to a splined region 16A of the mainshaft 12. The spline sleeve 22 has external teeth 62 and internal teeth 60. The internal teeth 60 of the spline sleeve 22 mate with external teeth on the splined region 16A of the mainshaft 12, enabling the spline sleeve 22 to rotate with the mainshaft 12 (i.e. the spline sleeve 22 is non-rotatably mounted to the mainshaft 12.) In the exemplary embodiment, the spline sleeve 22 has a thickness of approximately 0.708 inches.

The 3–4 shift ring 24 (see also FIGS. 3A and 3B) is mounted in surrounding relation to the spline sleeve 22. The 3–4 shift ring 24 has internal teeth 64 that mesh with the external teeth 62 of the spline sleeve 22. As such, the 3–4 shift ring 24 rotates with the mainshaft 12 (i.e. the 3–4 shift ring 24 is non-rotatably mounted to the mainshaft 12.) The 3–4 shift ring 24 also includes a body portion 66 having a first plurality of dogs 68A protruding from a first side of the body 66A and a second plurality of dogs 68B protruding from a second side of the body 66B. The body 66 also includes a circumferential shift fork groove 70 radially extending therein.

The mainshaft 3rd gear 26 has teeth 72 that extend from a body portion 74. The body portion 74 has a generally smooth central opening 76 and a plurality of radially spaced pockets 78 recessed therein (see also FIGS. 5A–6B.) The central opening 76 is mounted on the bearings of a split cage bearing 116, which in turn is rotatably mounted on the bearing region 18B of the mainshaft 12. As such, the mainshaft 3rd gear 26 is free to rotate with respect to the mainshaft 12 (i.e. rotatably mounted to the mainshaft 12.) In the exemplary embodiment, the mainshaft 3rd gear 26 has a diametrical pitch of 12, 32 teeth and a thickness of approximately 0.661 inches.

The 3–4 shift ring 24 is axially moveable with respect to the spline sleeve 22 into a neutral position, or one of two engaged positions. In a first engaged position of the 3–4 shift ring 24 (see FIG. 18), the second plurality of dogs 68B engage pockets 56 in the mainshaft 4th gear 20, enabling the mainshaft 4th gear 20 to rotate with the mainshaft 12 (i.e. non-rotatably coupling the mainshaft 4th gear 20 to the mainshaft 12.)

In a second engaged position of the 3–4 shift ring 24 (see FIG. 17), the first plurality of dogs 68A engage pockets 78 in the mainshaft 3rd gear 26, enabling the mainshaft 3rd gear 26 to rotate with the mainshaft 12 (i.e. non-rotatably coupling the mainshaft 3rd gear 26 to the mainshaft 12.)

It should be noted that in the exemplary embodiment, the first engaged position is opposite the second engaged position. Moreover, when the 3–4 ring 24 is in the first engaged position, the first plurality of dogs 68A are disengaged from the pockets 78 of the mainshaft 3rd gear 26. Similarly, when the 3–4 shift ring 24 is in the second engaged position the second plurality of dogs are disengaged from the pockets 56 of the mainshaft 4th gear 20.

In the neutral position of the 3–4 shift ring 24, the first and second plurality of dogs 68A and 68B are disengaged from the mainshaft 4th gear 20 and the mainshaft 3rd gear 26, respectively, enabling the mainshaft 4th gear 20 and the mainshaft 3rd gear 26 to each remain rotatably coupled to the mainshaft 12.

The mainshaft 1st gear 28 is coupled to the splined region 16B of the mainshaft 12. The mainshaft 1st gear 28 has external teeth 80 and internal teeth 82. The internal teeth 82 of the mainshaft 1st gear 28 mate with external teeth on the splined region 16B of the mainshaft 12, enabling the mainshaft 1st gear 28 to rotate with the mainshaft 12 (i.e. the mainshaft 1st gear 28 is non-rotatably mounted on the mainshaft 12.) In the exemplary embodiment, the mainshaft 1st gear 28 has a diametrical pitch of 10, 18 teeth and a thickness of approximately 0.761 inches.

The mainshaft 2nd gear 30 is coupled to the splined region 16C of the mainshaft 12. The mainshaft 2nd gear 30 has external teeth 84 and internal teeth 86. The internal teeth 86 of the mainshaft 2nd gear 30 mate with external teeth on the splined region 16C of the mainshaft 12, enabling the mainshaft 2nd gear 30 to rotate with the mainshaft 12 (i.e. the mainshaft 2nd gear 30 is non-rotatably mounted on the mainshaft 12.) In the exemplary embodiment, the mainshaft 2nd gear 30 has a diametrical pitch of 12, 27 teeth and a thickness of approximately 0.661 inches.

The mainshaft 6th gear 32 has teeth 88 that extend from a body portion 90. The body portion 90 has a generally smooth central opening 92 and a plurality of radially spaced pockets 94 recessed therein (see also FIGS. 5A–6B.) The central opening 92 is mounted on the bearings of a split cage bearing 116, which in turn is rotatably mounted on the bearing region 18C of the mainshaft 12. As such, the mainshaft 6th gear 32 is free to rotate with respect to the mainshaft 12 (i.e. rotatably mounted to the mainshaft 12.) In the exemplary embodiment, the mainshaft 6th gear 32 has a diametrical pitch of 12, 40 teeth and a thickness of approximately 0.661 inches.

The 5–6 shift ring 34 (see also FIGS. 4A and 4B) is mounted in surrounding relation to the splined region 16D of the mainshaft 12. The 5–6 shift ring 34 has internal teeth 96 that mesh with external teeth on splined region 16D of the mainshaft 12, enabling the 5–6 shift ring 34 to rotate with the mainshaft 12 (i.e. the 5–6 shift ring 34 is non-rotatably mounted on the mainshaft 12.) The 5–6 shift ring 34 also includes a body portion 98 having a first plurality of dogs 100A protruding from a first side of the body 98A and a second plurality of dogs 100B protruding from a second side of the body 98B. The body 98 also includes a circumferential shift fork groove 102 radially extending therein.

The mainshaft 5th gear 36 has teeth 118 that extend from a body portion 120. The body portion 120 has a generally smooth central opening 122 and a plurality of radially spaced pockets 124. Although, in the depicted embodiment, the pockets 124 extend into the central opening 122, it is also contemplated that the pockets 124 may be formed in the body portion 118 without extending into the central opening 122. The central opening 122 is mounted on the bearings of a split cage bearing 116, which in turn is rotatably mounted on the bearing region 18D of the mainshaft 12. As such, the mainshaft 5th gear 36 is free to rotate with respect to the mainshaft 12 (i.e. rotatably mounted on the mainshaft 12.) In one exemplary embodiment, the mainshaft 5th gear 36 is a stock Harley Davidson® mainshaft 5th gear. In one embodiment, an output gear 360 is integrally formed with the mainshaft 5th gear 36.

The 5–6 shift ring 34 is axially moveable with respect to the splined region 16D of the mainshaft 12 into a neutral position, or one of two engaged positions. In a first engaged position of the 5–6 shift ring 34 (see FIG. 20), the second plurality of dogs 100B engage pockets 94 in the mainshaft 6th gear 32, enabling the mainshaft 6th gear 32 to rotate with the mainshaft 12 (i.e. non-rotatably coupling mainshaft 6th gear 32 to the mainshaft 12.)

In a second engaged position of the 5–6 shift ring 34 (see FIG. 19), the first plurality of dogs 100A engage pockets 124 in the mainshaft 5th gear 36, enabling the mainshaft 5th gear 36 to rotate with the mainshaft 12 (i.e. non-rotatably coupling mainshaft 5th gear 36 to the mainshaft 12.)

It should be noted that in the exemplary embodiment, the first engaged position is opposite the second engaged position. Moreover, when the 5–6 shift ring 34 is in the first engaged position the first plurality of dogs 100A are disengaged from the pockets 124 of the mainshaft 5th gear 36. Similarly, when the 5–6 shift ring 34 is in the second engaged position the second plurality of dogs 100B are disengaged from the pockets 94 of the mainshaft 6th gear 32.

In the neutral position of the 5–6 shift ring 34, the first and second plurality of dogs 100A and 100B are disengaged from the mainshaft 5th gear 32 and the mainshaft 6th gear 36, respectively, enabling the mainshaft 5th gear 32 and the mainshaft 6th gear 36 to each remain rotatably coupled to the mainshaft 12.

As shown in FIG. 2, the countershaft 14 includes splined regions 15A, 15B, 15C and 15D and bearing regions 17A and 17B. An exemplary arrangement of the countershaft gears on the countershaft 14 and exemplary countershaft gears are described below.

The countershaft 4th gear 38 is coupled to splined region 15A of the countershaft 14. The countershaft 4th gear 38 has external teeth 104 and internal teeth 106. The internal teeth 106 of the countershaft 4th gear 38 mate with external teeth on the splined region 15A of the countershaft 14, enabling the countershaft 4th gear 38 to rotate with the countershaft 14 (i.e. the countershaft 4th gear 38 is non-rotatably mounted on the countershaft 14.) In the exemplary embodiment, the countershaft 4th gear 38 has a diametrical pitch of 12.7, 25 teeth and a thickness of approximately 0.661 inches.

The countershaft 3rd gear 40 is coupled to splined region 15B of the countershaft 14. The countershaft 3rd gear 40 has external teeth 84 and internal teeth 86. The internal teeth 86 of the countershaft 3rd gear 40 mate with external teeth on the splined region 15B of the countershaft 14, enabling the countershaft 3rd gear 40 to rotate with the countershaft 14 (i.e. the countershaft 3rd gear 40 is non-rotatably mounted on the countershaft 14.) In an exemplary embodiment, the countershaft 3rd gear 40 has a diametrical pitch of 12, 27 teeth and a thickness of approximately 0.661 inches.

The countershaft 1st gear 42 has teeth 108 that extend from a body portion 110. The body portion 110 has a generally smooth central opening 112 and a plurality of radially spaced pockets 114 recessed therein (see also FIGS. 5A–6B.) The central opening 112 is mounted on the bearings of a split cage bearing 116, which in turn is rotatably mounted on the bearing region 17A of the countershaft 14. As such, the countershaft 1st gear 42 is free to rotate with respect to the countershaft 14 (i.e. rotatably mounted on the countershaft 14.) In the exemplary embodiment, the countershaft 1st gear 42 has a diametrical pitch of 10, 31 teeth and a thickness of approximately 0.661 inches.

The spline sleeve 44 is coupled to splined region 15C of the countershaft 14. The spline sleeve 22 has external teeth 62 and internal teeth 60. The internal teeth 60 of the spline sleeve 44 mate with external teeth on the splined region 15C of the countershaft 14, enabling the spline sleeve 44 to rotate with the countershaft 14 (i.e. the spline sleeve 44 is non-rotatably mounted to the countershaft 14.) In the exemplary embodiment, the spline sleeve 44 has a thickness of approximately 0.708 inches.

The 1–2 shift ring 46 (see also FIGS. 3A and 3B) is coupled to the spline sleeve 44. The 1–2 shift ring 46 has internal teeth 64 that mesh with the external teeth 62 of the spline sleeve 44. As such, the 1–2 shift ring 46 rotates with the countershaft 14 (i.e. the 1–2 shift ring 46 is non-rotatably mounted on the countershaft 14.) The 1–2 shift ring 46 also includes a body portion 66 having a first plurality of dogs 68A protruding from a first side of the body 66A and a second plurality of dogs 68B protruding from a second side of the body 66B. The body 66 also includes a circumferential shift fork groove 70 radially extending therein.

The countershaft 2nd gear 48 has teeth 72 that extend from a body portion 74. The body portion 74 has a generally smooth central opening 76 and a plurality of radially spaced pockets 78 recessed therein (see also FIGS. 5A–6B.) The central opening 76 is mounted on the bearings of a split cage bearing 116, which in turn is rotatably mounted on the bearing region 17B of the countershaft 14. As such, the countershaft 2nd gear 48 is free to rotate with respect to the countershaft 14 (i.e. rotatably mounted on the countershaft 14.) In an exemplary embodiment, the countershaft 2nd gear 48 has a diametrical pitch of 12, 32 teeth and a thickness of approximately 0.661 inches.

The 1–2 shift ring 46 is axially moveable with respect to the spline sleeve 44 into a neutral position, or one of two engaged positions. In a first engaged position of the 1–2 shift ring 46 (see FIG. 15), the second plurality of dogs 68B engage pockets 114 in the countershaft 1st gear 42, enabling the countershaft 1st gear 42 to rotate with the countershaft 14 (i.e. non-rotatably coupling the countershaft 1st gear 42 to the countershaft 14.).

In a second engaged position of the 1–2 shift ring 46 (see FIG. 16), the first plurality of dogs 68A engage pockets 78 in the countershaft 2nd gear 48, enabling the countershaft 2nd gear 48 to rotate with the countershaft 14 (i.e. non-rotatably coupling the countershaft 2nd gear 48 to the countershaft 14.).

It should be noted that in the exemplary embodiment, the first engaged position is opposite the second engaged position. Moreover, when the 1–2 shift ring 46 is in the first engaged position the first plurality of dogs 68A are disengaged from the pockets 78 of the mainshaft second gear 48. Similarly, when the 1–2 shift ring 46 is in the second engaged position the second plurality of dogs 68B are disengaged from the pockets 114 of the mainshaft first gear 42.

In the neutral position of the 1–2 shift ring 46, the first and second plurality of dogs 68A and 68B are disengaged from the countershaft 1st gear 42 and the countershaft 2nd gear 48, respectively, enabling the countershaft 1st gear 42 and the countershaft 2nd gear 48 to each remain rotatably coupled to the countershaft 14.

In one embodiment, the countershaft 6th gear 49 is fixedly attached or integrally formed with the countershaft 14, enabling the countershaft 6th gear 49 to rotate with the countershaft 14 (i.e. the countershaft 6th gear 49 is non-rotatably coupled to the countershaft 14.) In an exemplary embodiment, the countershaft 6th gear 49 has a diametrical pitch of 12, 19 teeth and a thickness of approximately 0.671 inches.

The countershaft 5th gear 50 is coupled to splined region 15D of the countershaft 14. The countershaft 5th gear 50 has external teeth 126 and internal teeth 128. The internal teeth 128 of the countershaft 5th gear 50 mate with external teeth on the splined region 15D of the countershaft 14, enabling the countershaft 5th gear 50 to rotate with the countershaft 14 (i.e. the countershaft 5th gear 50 is non-rotatably mounted on the countershaft 14.) In one embodiment, the mainshaft 5th gear 36 is a stock Harley Davidson® mainshaft 5th gear.

Figure 9:
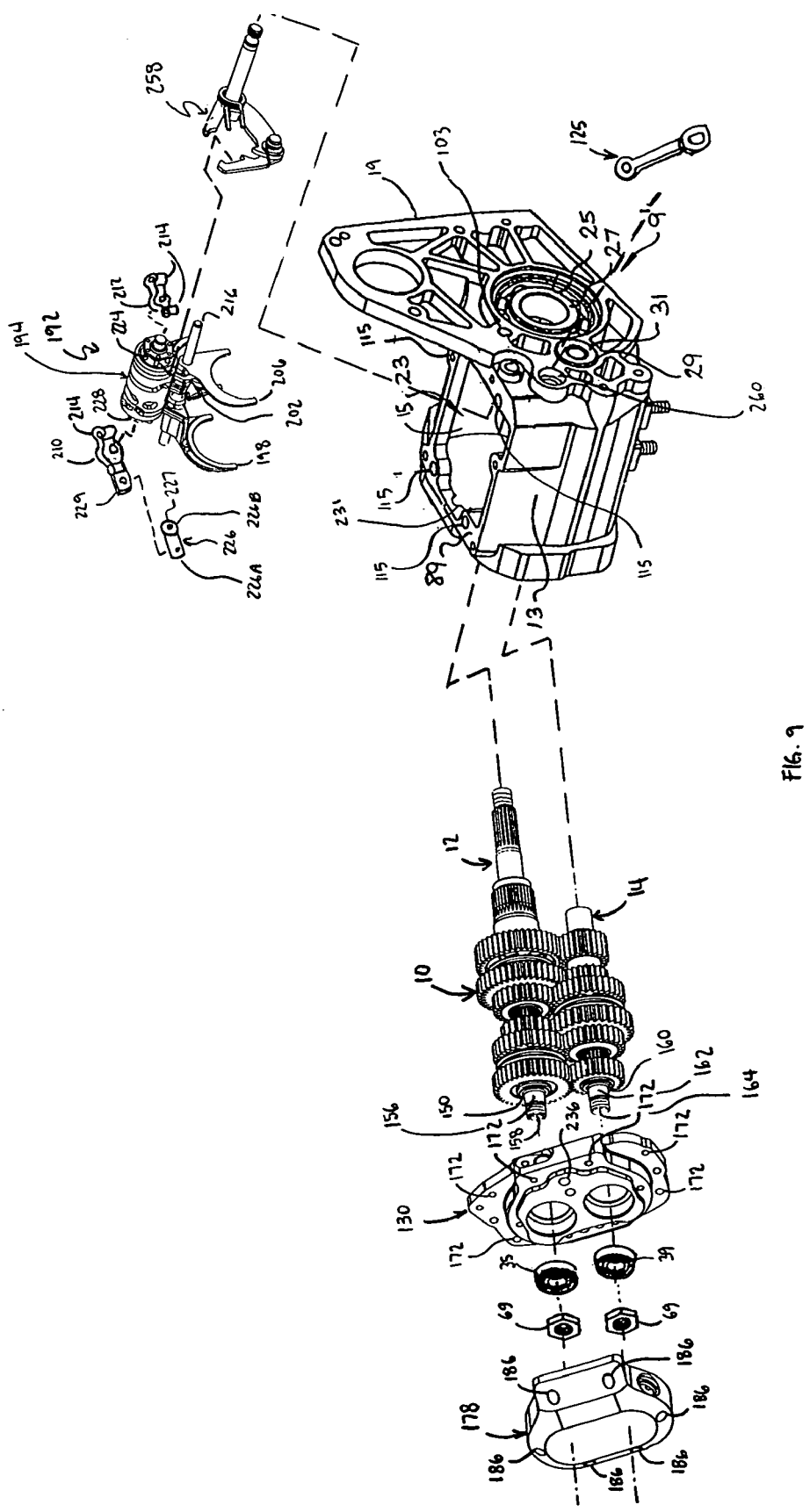
FIG. 9 is an exploded perspective view of the six speed gear assembly, the trapdoor and the end cover of FIG. 2, as well as a stock Harley Davidson® five speed transmission case, an exemplary shift assembly according to another aspect of the present invention and an exemplary shift pawl according to another aspect of the present invention.

In one embodiment, each of the mainshaft gears 1st through 6th (mainshaft gears 20, 26, 28, 30, 32, and 36, respectively) cannot move axially relative to the mainshaft 12 and each of the countershaft gears 1st through 6th (countershaft gears 38, 40, 42, 48, 49, and 50, respectively) cannot move axially relative to the countershaft 14. This configuration allows each mainshaft gear to mesh in 100% gear mesh engagement with its corresponding countershaft gear as shown in FIG. 9.

In one embodiment, the mainshaft gears 1st through 5th (mainshaft gears 20, 26, 28, 30, and 36, respectively) each have the same gear ratios as stock Harley Davidson® mainshaft gears 1st through 5th, and the mainshaft 6th gear has a gear ratio of approximately 0.885 to 1. In one embodiment, the mainshaft gears 1st through 5th (mainshaft gears 20, 26, 28, 30, and 36, respectively) each have generally the same thickness as stock Harley Davidson® mainshaft gears 1st through 5th. In another embodiment, the mainshaft gears 1st through 5th (mainshaft gears 20, 26, 28, 30, and 36, respectively) are each approximately 0.010 to 0.060 inches greater in thickness than the corresponding stock Harley Davidson® mainshaft gears 1st through 5th.

In one embodiment, any or all of the following gears: (the mainshaft 4th gear 20, the mainshaft 3rd gear 26, the mainshaft 6th gear 32, the mainshaft 5th gear 36, the countershaft 1st gear 42 and the countershaft 2nd gear 48) may have the general pocket configuration and the general internal diameter configuration of a first exemplary gear 298 as shown in FIGS. 5A–5B or the general pocket configuration and the general internal diameter configuration of a second exemplary gear 306 as shown in FIGS. 6A–6B.

Figure 5B:
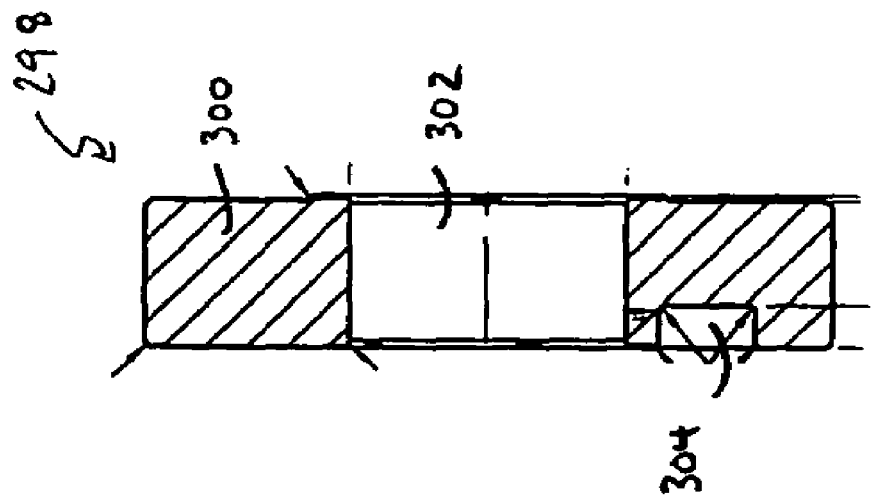
FIGS. 5A and 5B are side and cross-sectional views, respectively, of a first exemplary gear for use with a six speed gear assembly according to an exemplary embodiment of the present invention.
Figure 5A:
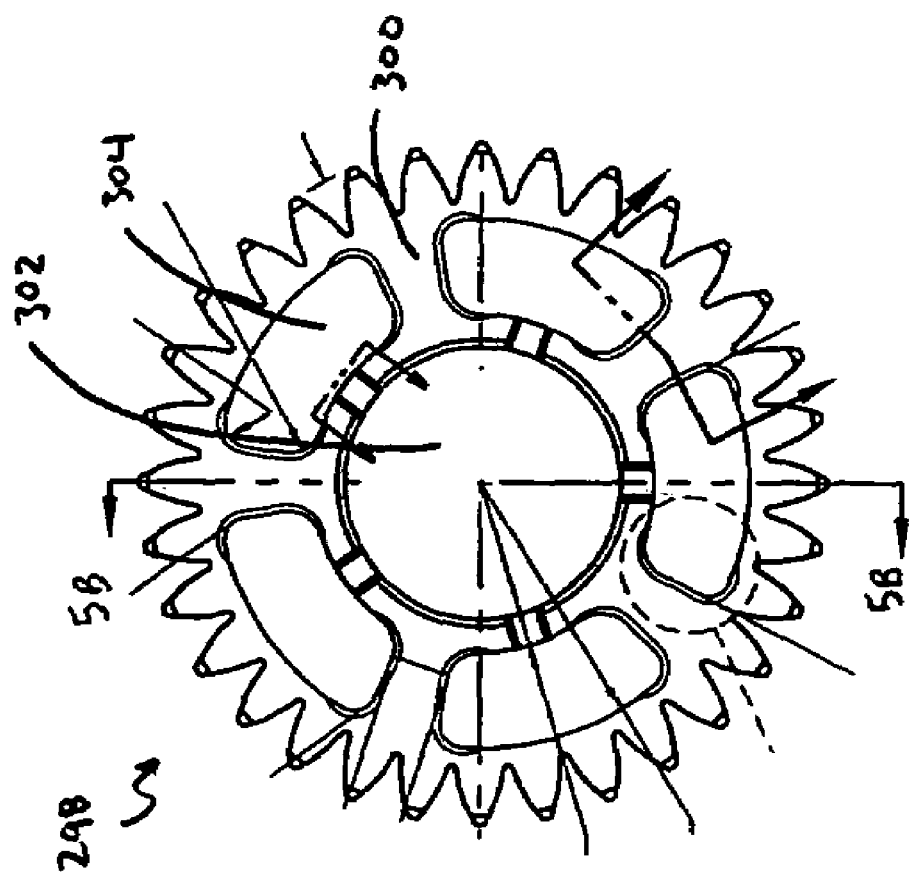

As shown in FIGS. 5A–5B, the first exemplary gear 298 has a body portion 300 with a generally smooth central opening 302 extending therethrough and a plurality of radially spaced pockets 304 recessed therein. The first exemplary gear 298 includes five pockets 304 equally spaced about a radius of the first exemplary gear 298. Each pocket 304 is generally trapezoid shaped and is recessed into the body portion 300 to a depth of approximately 0.185 inches. However, in other embodiments any number of pockets 304 having any appropriate shape may be used, and each pocket 304 may be recessed to any appropriate depth into the body portion 300 or may even extend entirely through the body portion 300. In the configuration of FIGS. 5A–5B, each side of the perimeter of each pocket 304 is defined by the body portion 300. As such, when a dog is inserted into a corresponding one of the pockets 304, the pocket 304 has a large bearing surface for the dog to bear against.

Figure 6B:
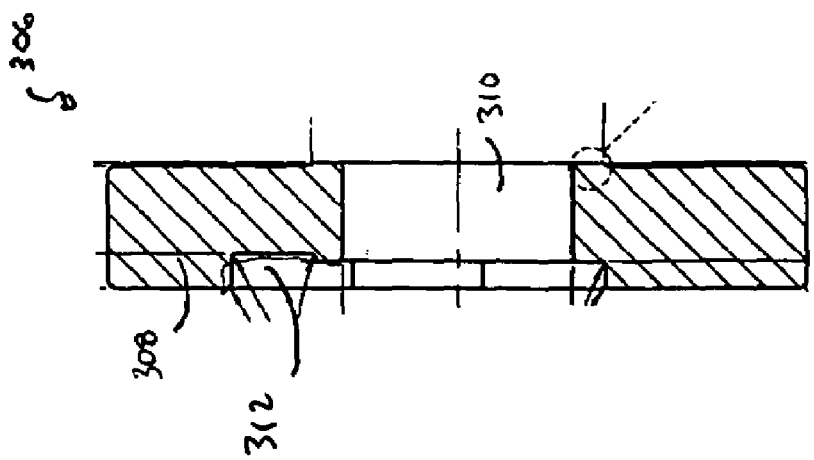
FIGS. 6A and 6B are side and cross-sectional views, respectively, of a second exemplary gear for use with a six speed gear assembly according to an exemplary embodiment of the present invention.
Figure 6A:
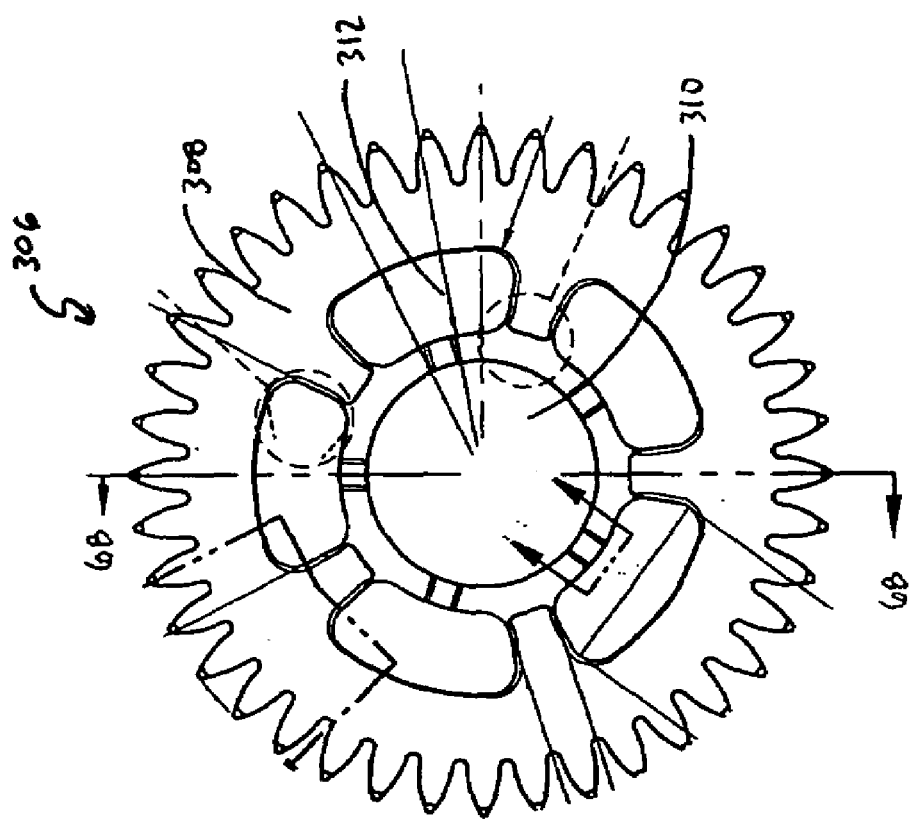

As shown in FIGS. 6A–6B, the second exemplary gear 306 has a body portion 308 with a generally smooth central opening 310 extending therethrough and a plurality of radially spaced pockets 312 recessed therein. The second exemplary gear 306 includes five pockets 312 equally spaced about a radius of the second exemplary gear 310 and extending into the central opening 310. Each pocket 312 is generally trapezoid shaped and is recessed into the body portion 308 to a depth of approximately 0.185 inches. However, in other embodiments any number of pockets 312 having any appropriate shape may be used, and each pocket 312 may be recessed to any appropriate depth into the body portion 308 or may even extend entirely through the body portion 308.

When the six speed gear assembly 10 is assembled, as shown for example in FIG. 9, the mainshaft 12 and the countershaft 14 may each be mounted to a conventional trapdoor, such as the trapdoor 21 of FIG. 1. Alternatively, when the six speed gear assembly 10 is assembled, the mainshaft 12 and the countershaft 14 may each be mounted to a trapdoor 130 (sometimes referred to as a bearing housing assembly) according to one aspect of the present invention (as shown for example in FIGS. 2, 7A–7B and 9).

Figure 7A:
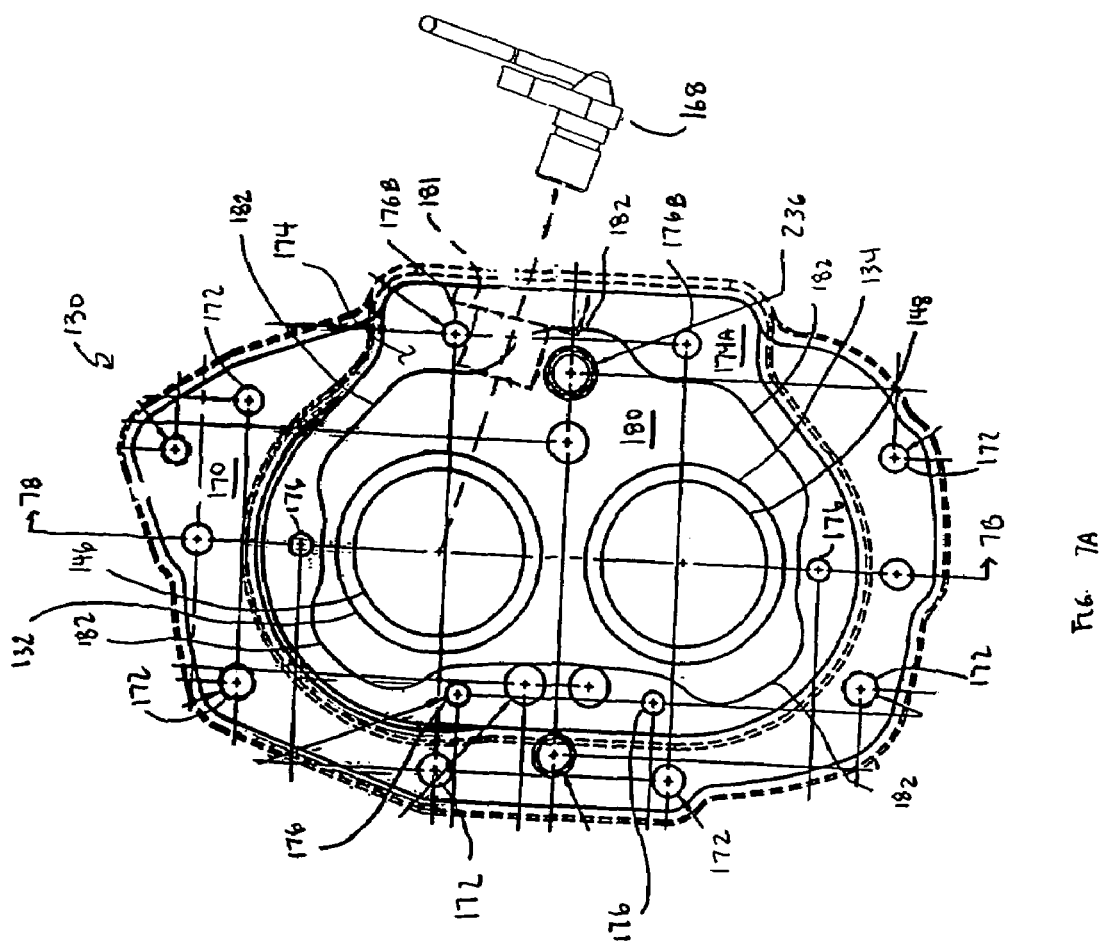
FIGS. 7A and 7B are side and cross-sectional views, respectively, of the trapdoor of FIG. 2, with FIG. 7B being taken from line 7B—7B of FIG. 7A and rotated 180 degrees.
Figure 7B:
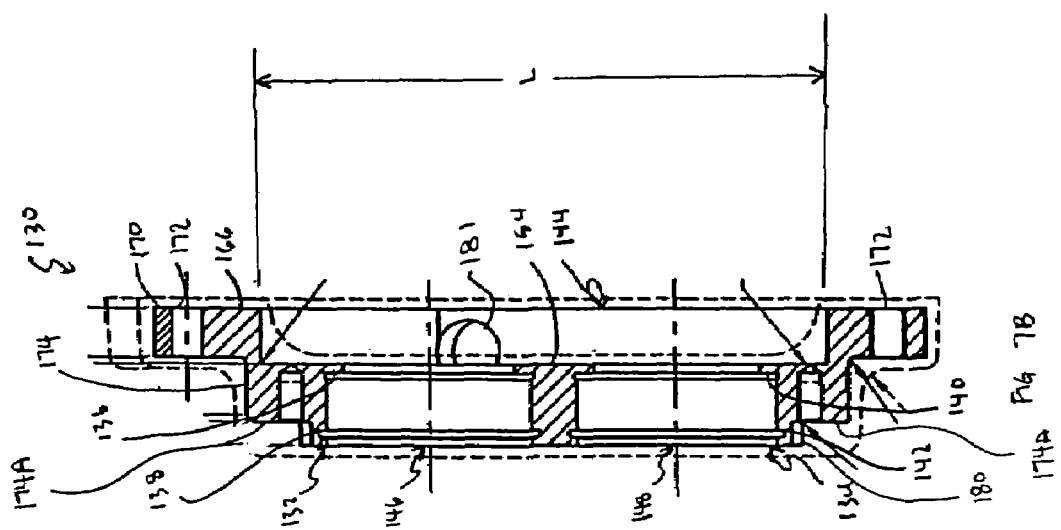

As shown in FIGS. 7A–7B, the trapdoor 130 includes a first recess 132 that receives the mainshaft trapdoor bearing 35 (see FIG. 2) and a second recess 134 that receives the countershaft trapdoor bearing 39 (see FIG. 2). The mainshaft trapdoor bearing 35 is pressed against a shoulder 136 of the first recess 132 and held thereagainst by a snap ring (not shown) disposed in snap ring groove 138. Similarly, the countershaft trapdoor bearing 39 is pressed against a shoulder 140 of the second recess 134 and held thereagainst by a snap ring (not shown) disposed in snap ring groove 142.

A third recess 144 extends in surrounding relation to the first and second recesses 132 and 134. The third recess 144 is substantially oval shaped, having a length L of a sufficient size to accommodate a meshed gear coupling of one of the mainshaft gears and its corresponding countershaft gear. For example, in one embodiment, the length L of the third recess 144 is of a sufficient size to accommodate the meshed coupling of the mainshaft 4th gear 20 and the countershaft 4th gear 38. In this embodiment, the length L of the third recess 144 is approximately 5.73 inches.

The depth of the third recess 144 is dimensioned to receive at least a portion of the thicknesses of one of the mainshaft gears and its corresponding countershaft gear. For example, in one embodiment, the depth of the third recess 144 is dimensioned to receive at least a portion of the thicknesses of each of the mainshaft 4th gear 20 and the countershaft 4th gear 38. In one embodiment, the depth of the third recess 144 is approximately 0.565 inches.

The third recess 144 of the trapdoor 130 allows for a six speed gear assembly to be mounted in the stock Harley Davidson® five speed transmission case 9 or a modified stock transmission case 9' (as shown in FIG. 9 and described in detail below) without modifying the outer dimensions of the stock Harley Davidson® five speed transmission case 9 or 9'. The third recess 144 of the trapdoor 130 also allows for a six speed gear assembly to be mounted in a stock Harley Davidson® five speed transmission case 9 or the modified stock transmission case 9' without decreasing the thickness of the gears compared to the thickness of the gears in a stock Harley Davidson® five speed gear assembly.

A six speed gear assembly can be mounted in the stock Harley Davidson® five speed transmission case 9 or the modified stock transmission case 9' without the use of the third recess 144 of the trapdoor 130; however, such an arrangement would likely require decreasing the thickness of the gears compared to the thickness of the gears in a stock Harley Davidson® five speed gear assembly. Such a decrease in the thickness of the gears increases the risk of a fracture of one or more of the gears.

As previously stated, the third recess 144 overlaps both the first and second recesses 132 and 134. The first recess 132 includes a first opening 146 that extends into the third recess 144 and across the width of the trapdoor 130 to receive the mainshaft 12. Similarly, the second recess 134 includes a second opening 148 that extends into the third recess 144 and across the width of the trapdoor 130 to receive the countershaft 14.

Viewing FIGS. 7A–7B and 9 together, to secure the six speed gear assembly 10 to the trapdoor 130, the mainshaft 12 is inserted into the first opening 146 of the trapdoor 130 until a shoulder 150 of the mainshaft abuts an interior wall 154 of the third recess 144. This allows a bearing surface 156 of the mainshaft 12 to be supported by the mainshaft trapdoor bearing 35 and a threaded end 158 of the mainshaft 12 to extend from an opening in the mainshaft trapdoor bearing 35. The hex nut 69, or another similar fastener, threadably engages the threaded end 158 of the mainshaft to secure the mainshaft 12 to the trapdoor 130.

Similarly, the countershaft 14 is inserted into the second opening 148 of the trapdoor 130 until a shoulder 160 of the countershaft 14 abuts the interior wall 154 of the third recess 144. This allows a bearing surface 162 of the countershaft 14 to be supported by the countershaft trapdoor bearing 39 and a threaded end 164 of the countershaft 14 to extend from an opening in the countershaft trapdoor bearing 39. The hex nut 69, or another similar fastener, threadably engages the threaded end 164 of the countershaft 14 to secure the countershaft 14 to the trapdoor 130.

With the exemplary six speed gear assembly 10 secured to the trapdoor 130 as described above, a mainshaft gear and its corresponding countershaft gear, such as the mainshaft 4th gear 20 and the countershaft 4th gear 38, are each substantially disposed within the third recess 144 of the trapdoor 130. In one embodiment, a mainshaft gear and its corresponding countershaft gear, such as the mainshaft 4th gear 20 and the countershaft 4th gear 38, are disposed within the trapdoor and are substantially flush with or extend slightly from an end surface 166 of the trapdoor 130, which defines the third recess 144.

In one embodiment, such as that shown in FIG. 7A, a speedo sensor 168, for example a stock Harley Davidson® magnetic speedo sensor, is mounted in an angled bore 181 formed in a sidewall of the trapdoor 130, adjacent to the third recess 144 of the trapdoor 130. As such, when the six speed gear assembly 10 is mounted to the trapdoor 130, the speedo sensor 168 is disposed in close proximity to one of the two gears that are mounted within the third recess 144 of the trapdoor 130.

The speedo sensor 168 counts the number of gear teeth per unit time of the gear that rotates in close proximity to it. From this calculation, the speed of the motorcycle, to which the six speed gear assembly 10 is attached, is determined. In one embodiment, the mainshaft 4th gear 20 is mounted within the third recess 144 of the trapdoor such that it is disposed in close proximity to the speedo sensor 168. In this embodiment, the speedo sensor 168 determines the rotational speed of the mainshaft 4th gear 20.

Since the stock Harley Davidson® five speed transmission 8 also includes a speedo sensor that measures the rotational speed of the stock Harley Davidson® mainshaft 4th gear and calculates the speed of the motorcycle to which the transmission 8 is attached based on the measured rotational speed of the stock Harley Davidson® mainshaft 4th gear, it is advantageous when retrofitting to the exemplary embodiment six speed gear assembly 10 to a stock Harley Davidson® five speed transmission case to position the mainshaft 4th gear 20 of the six speed gear assembly 10 in close proximity to the speedo sensor 168 so that recalibration of the speedo sensor 168 is not required in order to determine the speed of the motorcycle to which the six speed gear assembly 10 is attached.

As shown in FIGS. 7A–7B, the trapdoor 130 includes a base 170. The base 170 includes the end surface 166 of the trapdoor 130. The trapdoor 130 may be mounted to the stock Harley Davidson® five speed transmission case 9 of FIG. 1; or as shown in FIG. 9, the trapdoor 130 may be mounted to a modified stock Harley Davidson® five speed transmission case 9', by fasteners (not shown) that extend through openings 172 in the base 170 of the trapdoor 130 and attach to a mounting location on the modified stock transmission case 9' to secure the trapdoor 130 thereto. The modification of the stock transmission case 9 is described in detail below.

As shown in FIGS. 7A–7B, adjacent to the base 170 of the trapdoor 130 is a first protruding surface 174 that axially extends from the base 170 of the trapdoor 130 and includes fastener openings 176B for securing the trapdoor 130 to the transmission case 9 or 9' and fastener openings 176 for securing an end cover 178 (as shown for example in FIGS. 2, 8A–8B, and 9 and sometimes referred to as a clutch release cover) to the trapdoor 130. The first protruding surface 174 includes a face surface 174A that is directed oppositely from the end surface 166 of the base 170.

Adjacent to the first protruding surface 174 of the trapdoor 130 is a second protruding surface 180 that axially extends from the first protruding surface 174 of the trapdoor 130 and laterally extends from the first and second recesses 132 and 134 of the trapdoor 130. The second protruding surface 180 is generally oval shaped with a plurality of ears 182 extending therefrom. The second protruding surface 180 also includes a shift fork shaft opening 236, discussed below.

FIGS. 8A–8B show the end cover 178. The end cover 178 includes a recess 184 (drawn in bold for clarity) and fastener openings 186 and 186B. Viewing FIGS. 7A–9 together, the end cover 178 is mounted to the trapdoor 130 over the first and second recesses 132 and 134 of the trapdoor 130 by placing the recess 184 of the end cover 178 over the second protruding surface 180 of the trapdoor 130, such that an interior surface 188 of the recess 184 of the end cover 178 abuts the face surface 174A of the first protruding surface 174 of the trapdoor 130.

The recess 184 of the end cover 178 has the same general shape and size of the second protruding surface 180 of the trapdoor 130 such that the second protruding surface 180 of the trapdoor 130 mates with the recess 184 of the end cover 178 in a manner that prevents rotational movement of the end cover 178 with respect to the trapdoor 130. For example, in the depicted embodiment of FIGS. 8A–8B, the recess 184 of the end cover 178 is generally oval shaped with a plurality of ears 190 extending therefrom that substantially mimic the shape and size of the ears 182 of the second protruding surface 180 of the trapdoor 130. However, in other embodiments the second protruding surface 180 of the trapdoor 130 and the recess 184 of the end cover 178 may any other appropriate shape and need not be of the same general shape and/or the same general size as long as a rotational movement of the end cover 178 with respect to the trapdoor 130 is prevented when the second protruding surface 180 of the trapdoor 130 is inserted into the recess 184 of the end cover 178.

In essence, the second protruding surface 180 provides a guide for guiding the end cover 178 in the appropriate position with respect to the trapdoor 130, preventing a rotation of the end cover 178 relative to the trapdoor 130 and aligning the appropriate fastener holes that allow for a coupling of the end cover 178 to the trapdoor 130.

When the recess 184 of the end cover 178 receives the second protruding surface 180 of the trapdoor 130, the fastener openings 186 and 186B of the end cover 178 are automatically aligned with the fastener openings 176 and 176B of the trapdoor 130. The end cover 178 is then mounted to the trapdoor 130 by inserting fasteners (not shown) into and through the fastener openings 186 of the end cover 178 and engaging the fastener openings 176 of the trapdoor 130, which in one embodiment are internally threaded.

The end cover 178 and the trapdoor 130 are mounted to the stock Harley Davidson® five speed transmission case 9 of FIG. 1, for example, by inserting fasteners (not shown) into and through the fasteners openings 186B of the end cover 178 and the fasteners opening 176B of the trapdoor 130 and engaging the fasteners (not shown) with openings in the transmission case 9. The end cover 178 and the trapdoor 130 are mounted to the modified stock transmission case 9' in a similar fashion.

Figure 10:
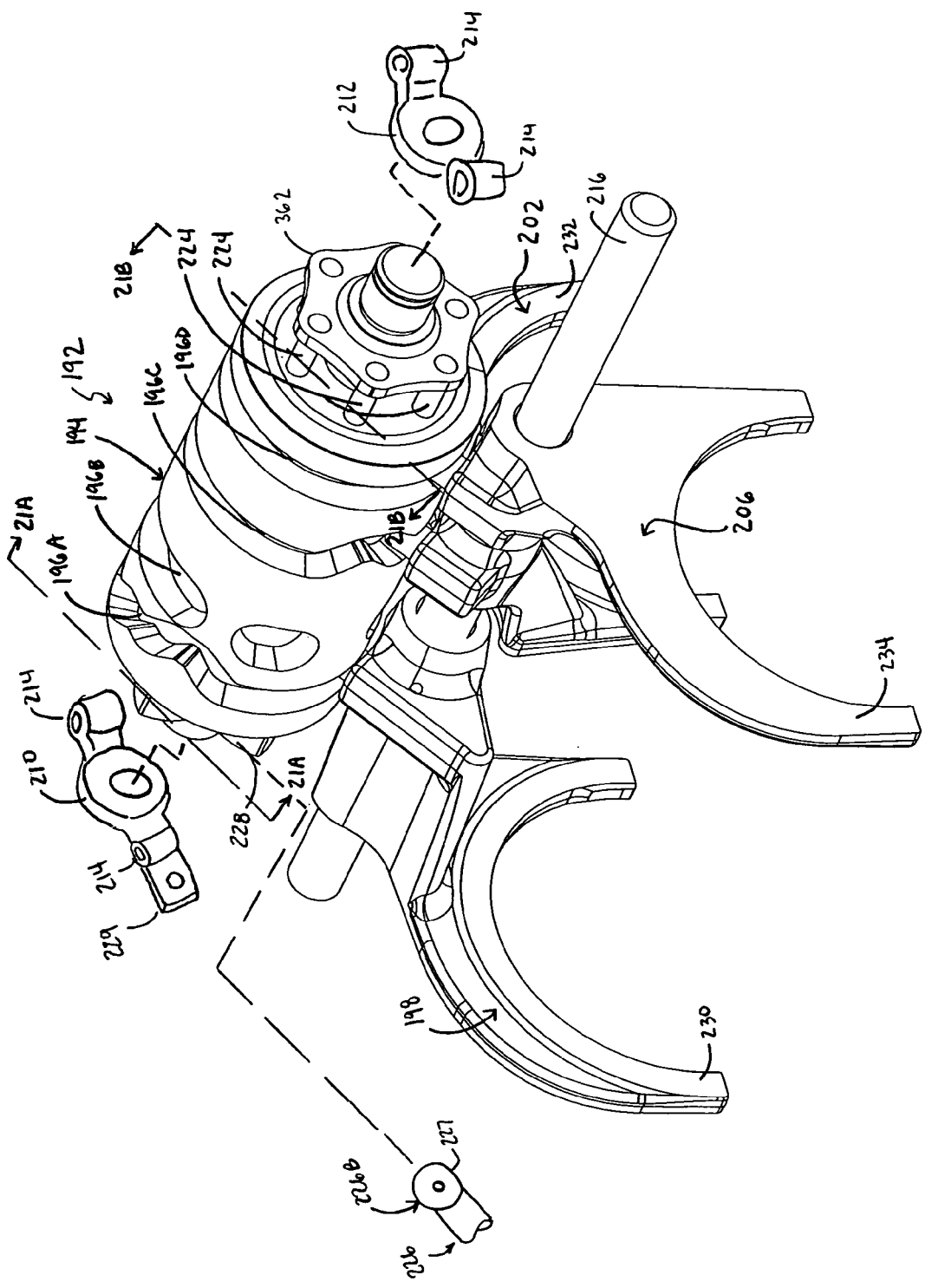
FIG. 10 is an enlarged perspective view of the shift assembly shown in FIG. 9.

FIG. 10 shows a shifting assembly 192. The shifting assembly 192 includes a shift drum 194 supported by first and second shift drum supports 210 and 212; a detent track 228 adjacent to one side of the shift drum 194; and a generally hexagonally shaped shift pin plate 362 adjacent to an opposite side of the shift drum 194. The shift pin plate 362 supports a plurality of shift pins 224. The shift drum 194 includes shift drum grooves 196A–196D recessed therein. A 3–4 shift fork 198 (see also FIGS. 11A–11B) includes a pin 200 that rides within and is guided by the 3–4 shift drum groove 196A. The 3–4 shift fork 198 also includes a generally semi-circular shaped fork arm 230 that mates with the shift fork groove 70 in the 3–4 shift ring 24 (see also FIGS. 2 and 3A–3B.)

A 1–2 shift fork 202 (see also FIGS. 12A–12B) includes a pin 204 that rides within and is guided by 1–2 shift drum groove 196C. The 1–2 shift fork 202 also includes and a generally semi-circular shaped fork arm 232 that mates with the shift fork groove 70 in the 1–2 shift ring 46 (see also FIGS. 2 and 3A–3B.).

A 5–6 shift fork 206 (see also FIGS. 13A–13B) includes a pin 208 that rides within and is guided by 5–6 shift drum groove 196D. The 5–6 shift fork 206 also includes a generally semi-circular shaped fork arm 234 that mates with the shift fork groove 102 in the 5–6 shift ring 34 (see also FIGS. 2 and 4A–4B.).

Figure 14:
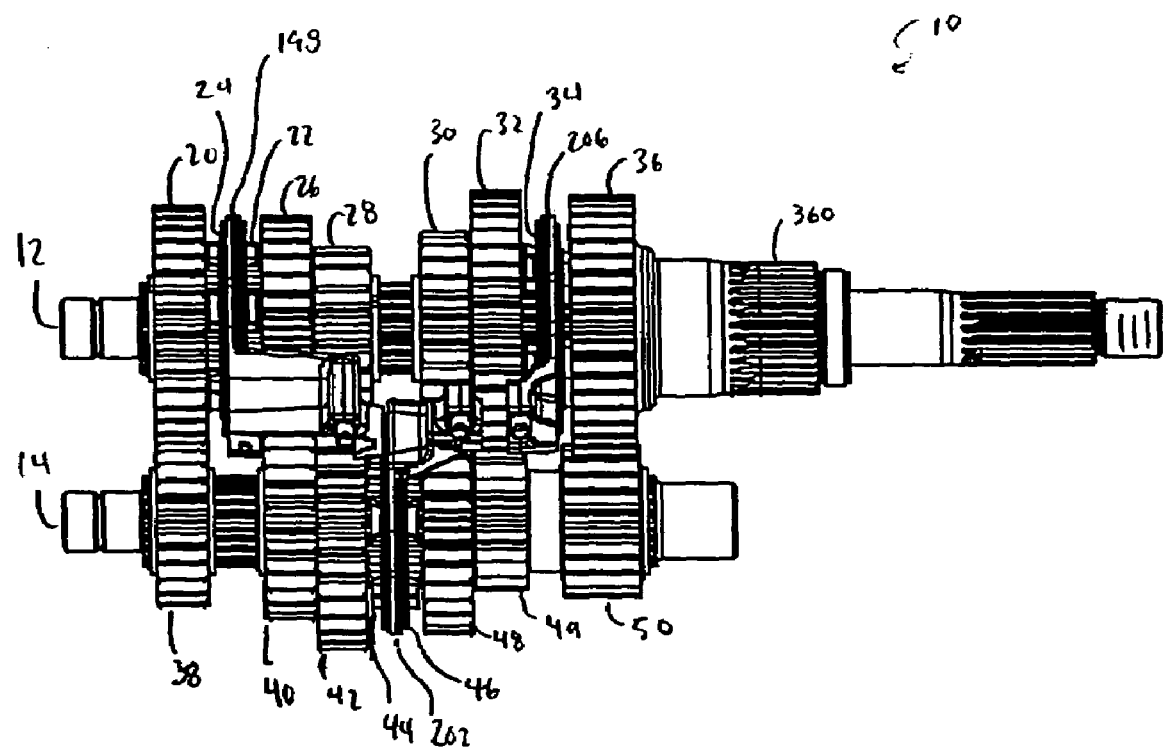
FIG. 14 is a side view of an exemplary six speed gear assembly according to one aspect of the present invention shown in a neutral gear position.

A neutral switch (not shown) rides within the neutral track shift drum groove 196B for detecting a neutral gear position of the six speed gear assembly 10 (as shown in FIG. 14.) In one embodiment, the neutral track shift drum groove 196b is approximately 0.44 inches wide. The increased width of the neutral track shift drum groove 196b similar to the stock Harley Davidson® neutral track shift drum groove allows for a greater variety of neutral switches to be used to detect the neutral gear position.

As shown in FIG. 9, the first and second shift drum supports 210 and 212 are mounted to the top surface 89 of the central portion 13 of the modified stock transmission case 9' by fasteners (not shown) that extend through mounting collars 214 of the drum supports 210 and 212 and into mounting holes 115 of the modified stock transmission case 9'. With the shift drum supports 210 and 212 so mounted, the shift forks 198, 202 and 206 extend through central portion opening 15 and into transmission case cavity 23.

Figure 12B:
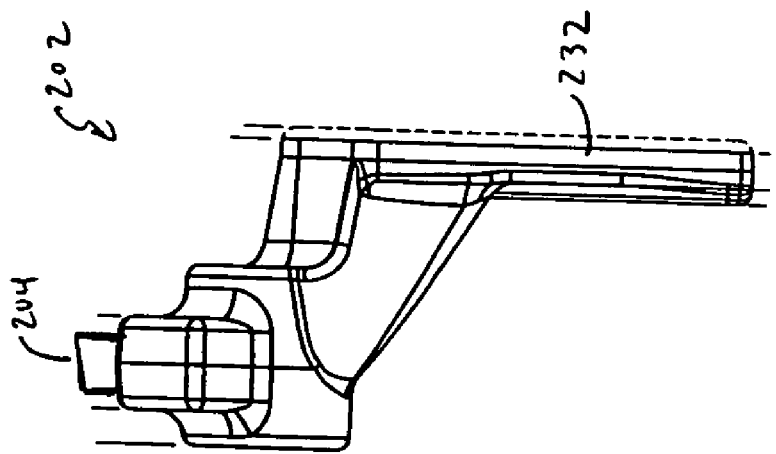
FIGS. 12A and 12B are side and front views, respectively, of a shift fork for use with a shift assembly according to an exemplary embodiment of the present invention.
Figure 12A:
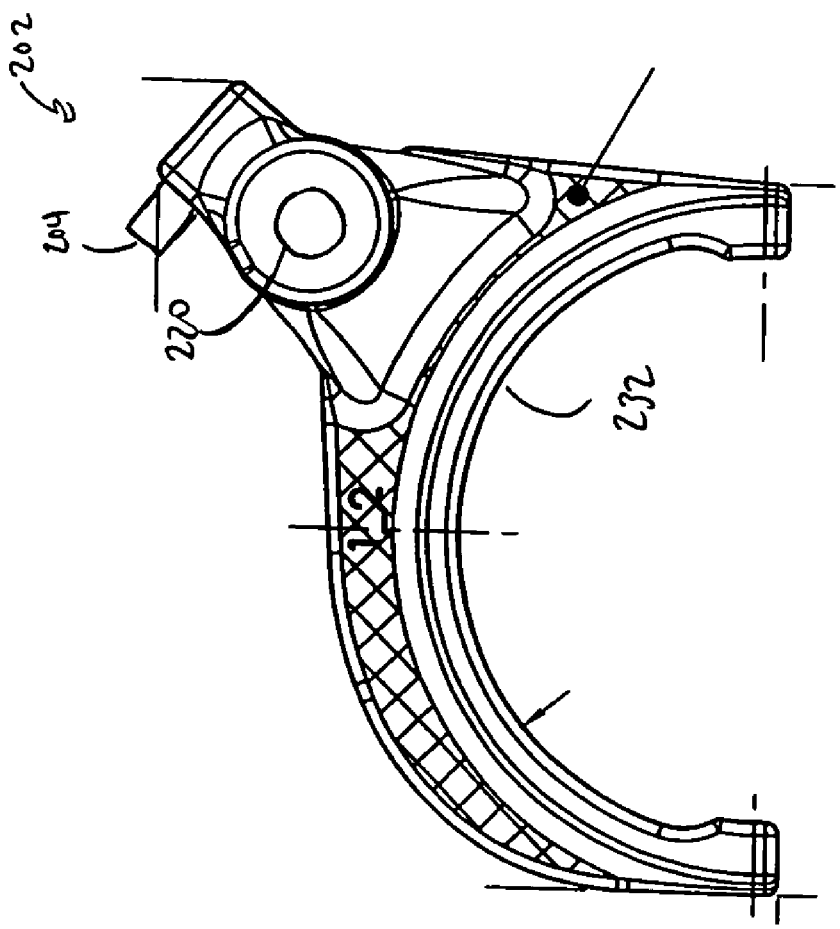
Figure 13B:
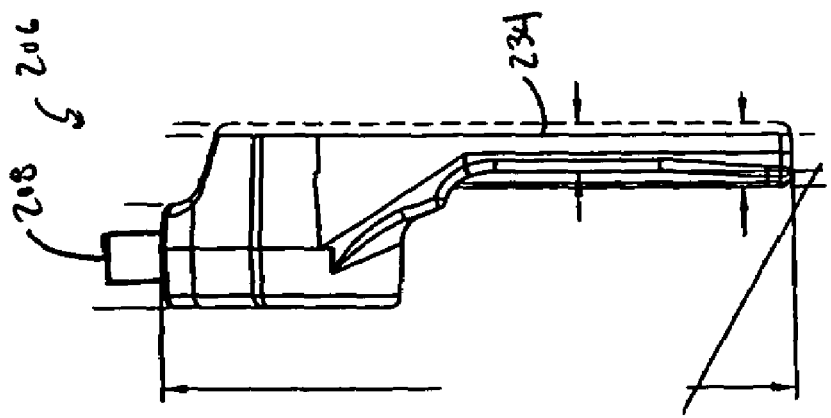
FIGS. 13A and 13B are side and front views, respectively, of a shift fork for use with a shift assembly according to an exemplary embodiment of the present invention.
Figure 13A:
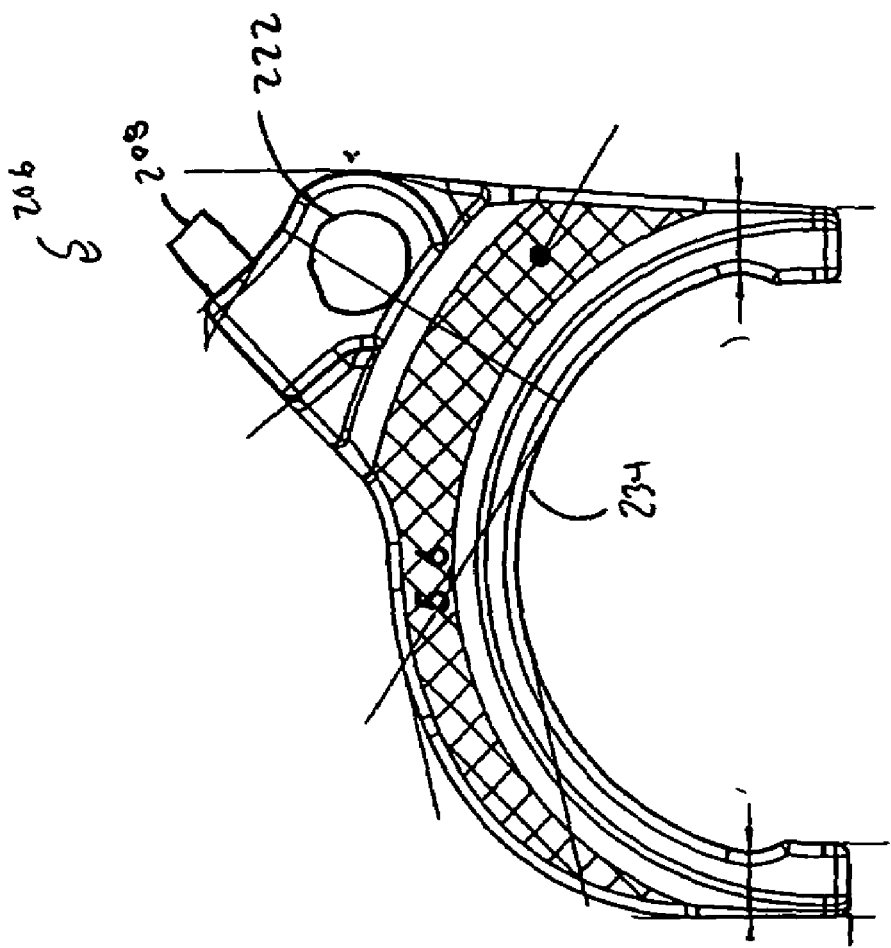

All of the shift forks 198, 202 and 206 are supported within the cavity 23 by a shift fork shaft 216, which extends through openings 218, 220 and 222, respectively, in the shift forks 198, 202 and 206 (openings 218, 220 and 222 are as shown in FIGS. 11A, 12A and 13A, respectively.) The shift fork shaft 216 is mounted to the modified stock transmission case 9' as described below.

As shown in FIG. 9, in operation, when a shifter rod lever 125 rotates in response to a motorcycle operator actuating a shift pedal (not shown), a shift pawl 258 (described below) correspondingly rotates the shift pins 224 of the shift drum 192, causing the shift drum 192 to rotate. As the shift drum 192 rotates, an interaction of a detent follower 226 with the detent track 228, which is mounted on the shift drum 192, biases the shift drum 192 to predetermined angular positions. As shown, the detent follower 226 has a first end 226A pivotally supported by a portion 229 of the first shift drum support 210 and a second end 226B having a roller 227 biased into contact with the detent track 228. The rotation of the shift drum 192 to the predetermined angular positions causes one or more of shift forks 198, 202 and 206 to move axially along shift fork shaft 216 by guiding action of the shift drum grooves 196A, 196C and 196D, respectively.

Axial movements of the 3–4 shift fork 198 causes corresponding axial movements of the 3–4 shift ring 24. Similarly, axial movements of the 1–2 shift fork 202 causes corresponding axial movements of the 1–2 shift ring 46. Also similarly, axial movements of the 5–6 shift fork 206 causes corresponding axial movements of the 5–6 shift ring 34.

In an exemplary embodiment, in order to mount the shift fork shaft 216 to the stock Harley Davidson® five speed transmission case 9 of FIG. 1, the shift fork shaft mounting flange 101 of the transmission case 9 of FIG. 1 must be removed as shown in the modified stock transmission case 9' of FIG. 9), otherwise the shift fork shaft mounting flange 101 would interfere with the axial movements of the 3–4 shift fork 198. In an alternative embodiment, rather than modifying an existing transmission case, a new transmission case is used.

In the embodiment of FIG. 9, the shift fork shaft mounting flange 101 is removed and the shift fork shaft 216 is mounted between the shift fork shaft opening 236 in the trapdoor 130 and the shift fork shaft opening 103 in the side wall 19 of the modified stock transmission case 9'. In one exemplary embodiment, a template is provided for defining the portion of the shift fork shaft mounting flange 101 to be removed. In the depicted embodiment, when the shift fork shaft mounting flange 101 is removed a generally semi-circular opening 231 is formed, having a size sufficient for allowing the passage of the 3–4 shift fork 198 riding on the shift fork shaft 216.

When the trapdoor 130 is attached to the modified stock transmission case 9', the shift fork shaft opening 236 in the trapdoor 130 is aligned with both the shift fork shaft opening 103 in the side wall 19 of the modified stock transmission case 9' and with the location of the opening 119 of the shift fork shaft mounting flange 101 prior to the removal of the fork shaft mounting flange 101. As such, the position of the shift drum 194 relative to the modified stock transmission case 9' is unchanged from that of the stock Harley Davidson® five speed transmission 8. In one embodiment, one end of the shift fork shaft 216 threadingly engages the shift fork shaft opening 236 in the trapdoor 130 and another end of the shift fork shaft 216 fits snugly within the shift fork shaft opening 103 in the side wall 19 of the modified stock transmission case 9'.

As shown in FIGS. 11A–11B, the 3–4 shift fork 198 includes an elongated generally horizontal arm 238. The pin 200 extends generally perpendicularly and generally upwardly from the horizontal arm 238 and the fork arm 230 extends generally perpendicularly and generally downwardly from the horizontal arm 238. When the 3–4 shift fork 198 is used on the modified stock transmission case 9', the elongated length of the horizontal arm 238 allows the pin 200 of the 3–4 shift fork 198 to extend through the central portion opening 15 of the modified stock transmission case 9' even when the fork arm 230 of the 3–4 shift fork 198 is in close proximity to the trapdoor 130 (such as when the fork arm 230 of the 3–4 shift fork 198 has moved the 3–4 shift ring 24 into engagement with the mainshaft 4th gear 20.) The elongated length of the horizontal arm 238 of the 3–4 shift fork 198 allows the exemplary six speed gear assembly 10 to be incorporated into the modified stock transmission case 9'.

When the 3–4 shift fork 198 is used with the six speed gear assembly 10 and the 3–4 shift ring 24 is engaged with the mainshaft 4th gear 20, the elongated length of the horizontal arm 238 also allows the 3–4 shift fork 198 to straddle or extend over each of the 3–4 shift ring 24 (and its underlying spline sleeve 22), the mainshaft 3rd gear 26, the mainshaft 1st gear 28, and a portion of the 1–2 shift ring 46.

When the 3–4 shift fork 198 is used with the six speed gear assembly 10 and the 3–4 shift ring 24 is engaged with the mainshaft 3rd gear 26, the elongated length of the horizontal arm 238 also allows the 3–4 shift fork 198 to straddle or extend over each of the 3–4 shift ring 24 (and a portion of its underlying spline sleeve 22), the mainshaft 3rd gear 26, the mainshaft 1st gear 28 and the second side 66B of the 1–2 shift ring 46, such that an oil slot 238A in the shift fork 198 is disposed above the second side 66B of the 1–2 shift ring 46. In one exemplary embodiment, the horizontal arm 238 is approximately 2.01 inches in length.

As shown in FIGS. 14–20, when the six speed gear assembly 10 is assembled, each mainshaft gear meshes with a corresponding countershaft gear. FIG. 14 shows the six speed gear assembly 10 in the neutral gear position. When the six speed gear assembly 10 is in the neutral gear position, each shift ring 24, 34, and 46 is in its neutral position (described above) and hence torque is not transferred between the mainshaft 12 and countershaft 14 since each meshed gear pairing includes one gear that is rotatably coupled to its corresponding shaft and one gear that is non-rotatably coupled to its corresponding shaft.

Figure 15:
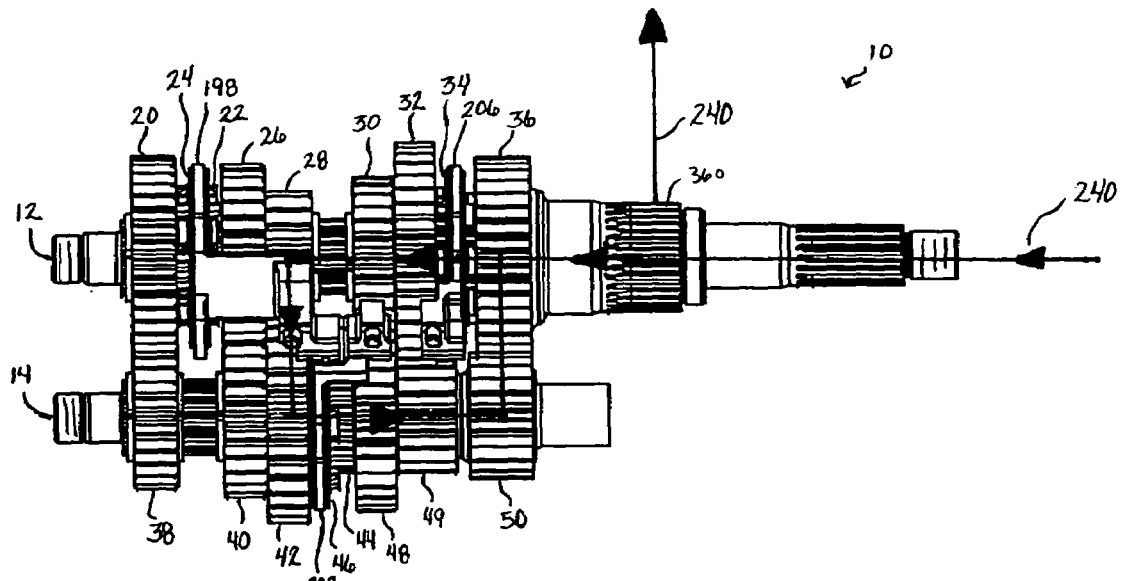
FIG. 15 is a side view of an exemplary six speed gear assembly according to one aspect of the present invention shown in a 1st gear position.

FIG. 15 shows the six speed gear assembly 10 in the 1st gear position. When the six speed gear assembly 10 is in the 1st gear position, the 3–4 shift ring 24 and the 5–6 shift ring 34 are each in their neutral positions, while the 1–2 shift ring 46 is engaged with the countershaft 1st gear 42, which causes the countershaft 1st gear 42 to be non-rotatably coupled to the countershaft 14. Since the mainshaft 1st gear 28 is non-rotatably coupled to the mainshaft 12, torque is transferred between the mainshaft 12 and the countershaft 14 by the mainshaft 1st gear 28 and the countershaft 1st gear 42; and since the countershaft 5th gear 50 is non-rotatably coupled to the countershaft 14, torque is transferred to the mainshaft 5th gear 36 as shown by arrow 240. Torque is then transferred from the output gear 360 of the mainshaft 5th gear 36 to a drive belt or drive chain (not shown) to drive a rear wheel of the motorcycle.

Figure 16:
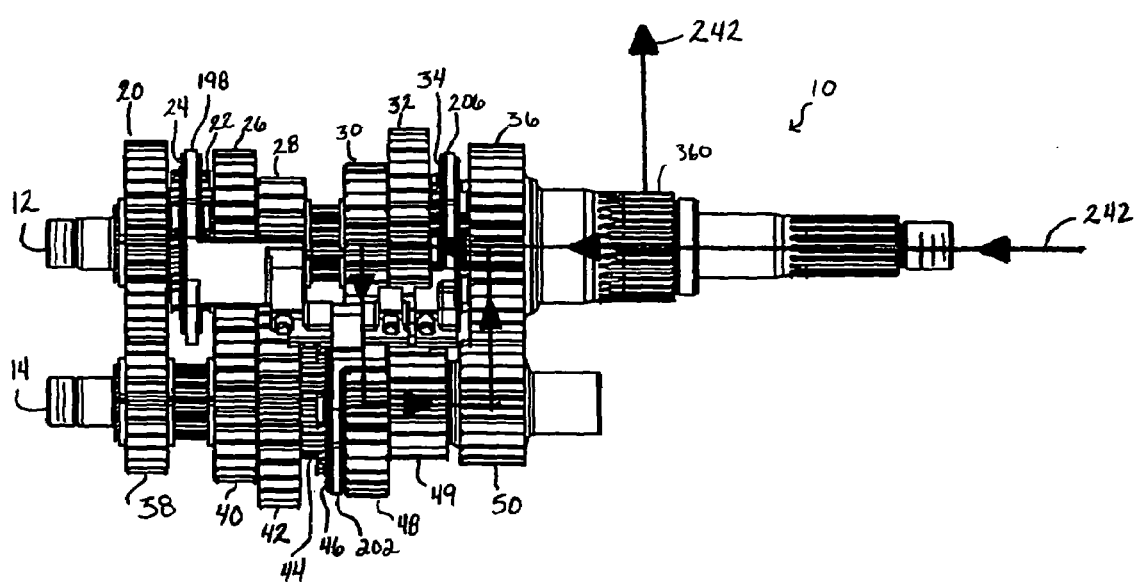
FIG. 16 is a side view of an exemplary six speed gear assembly according to one aspect of the present invention shown in a 2nd gear position.

FIG. 16 shows the six speed gear assembly 10 in the 2nd gear position. When the six speed gear assembly 10 is in the 2nd gear position, the 3–4 shift ring 24 and the 5–6 shift ring 34 are each in their neutral positions, while the 1–2 shift ring 46 is engaged with the countershaft 2nd gear 48, which causes the countershaft 2nd gear 48 to be non-rotatably coupled to the countershaft 14. Since the mainshaft 2nd gear 30 is non-rotatably coupled to the mainshaft 12, torque is transferred between the mainshaft 12 and the countershaft 14 by the mainshaft 2nd gear 30 and the countershaft 2nd gear 48; and since the countershaft 5th gear 50 is non-rotatably coupled to the countershaft 14, torque is transferred to the mainshaft 5th gear 36 as shown by arrow 242. Torque is then transferred from the output gear 360 of the mainshaft 5th gear 36 to the drive belt to drive the rear wheel of the motorcycle.

Figure 17:
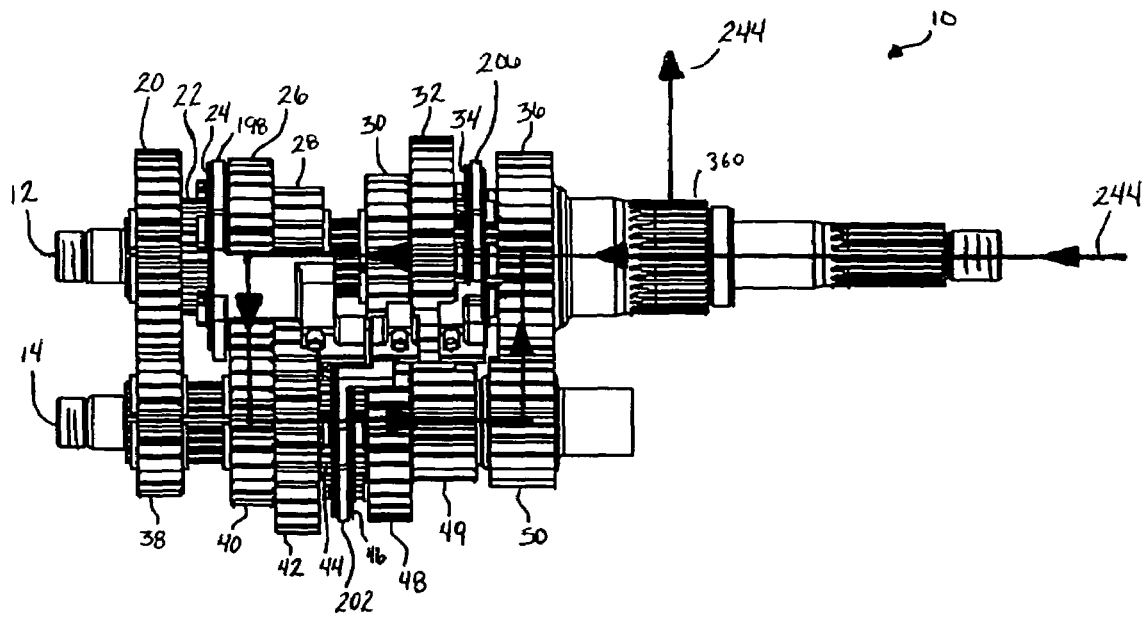
FIG. 17 is a side view of an exemplary six speed gear assembly according to one aspect of the present invention shown in a 3rd gear position.

FIG. 17 shows the six speed gear assembly 10 in the 3rd gear position. When the six speed gear assembly 10 is in the 3rd gear position, the 1–2 shift ring 46 and the 5–6 shift ring 34 are each in their neutral positions, while the 3–4 shift ring 24 is engaged with the mainshaft 3rd gear 26, which causes the mainshaft 3rd gear 26 to be non-rotatably coupled to the mainshaft 12. Since the countershaft 3rd gear 40 is non-rotatably coupled to the countershaft 14, torque is transferred between the mainshaft 12 and the countershaft 14 by the mainshaft 3rd gear 26 and the countershaft 3rd gear 40; and since the countershaft 5th gear 50 is non-rotatably coupled to the countershaft 14, torque is transferred to the mainshaft 5th gear 36 as shown by arrow 244. Torque is then transferred from the output gear 360 of the mainshaft 5th gear 36 to the drive belt to drive the rear wheel of the motorcycle.

Figure 18:
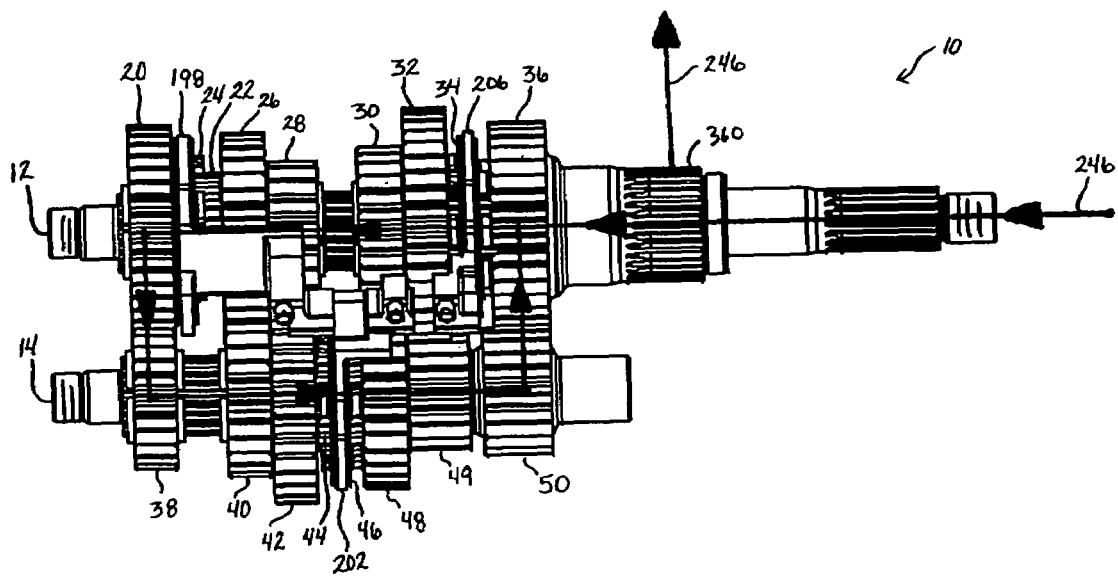
FIG. 18 is a side view of an exemplary six speed gear assembly according to one aspect of the present invention shown in a 4th gear position.

FIG. 18 shows the six speed gear assembly 10 in the 4th gear position. When the six speed gear assembly 10 is in the 4th gear position, the 1–2 shift ring 46 and the 5–6 shift ring 34 are each in their neutral positions, while the 3–4 shift ring 24 is engaged with the mainshaft 4th gear 20, which causes the mainshaft 4th gear 20 to be non-rotatably coupled to the mainshaft 12. Since the countershaft 4th gear 38 is non-rotatably coupled to the countershaft 14, torque is transferred between the mainshaft 12 and the countershaft 14 by the mainshaft 4th gear 20 and the countershaft 4th gear 38; and since the countershaft 5th gear 50 is non-rotatably coupled to the countershaft 14, torque is transferred to the mainshaft 5th gear 36 as shown by arrow 246. Torque is then transferred from the output gear 360 of the mainshaft 5th gear 36 to the drive belt to drive the rear wheel of the motorcycle.

Figure 19:
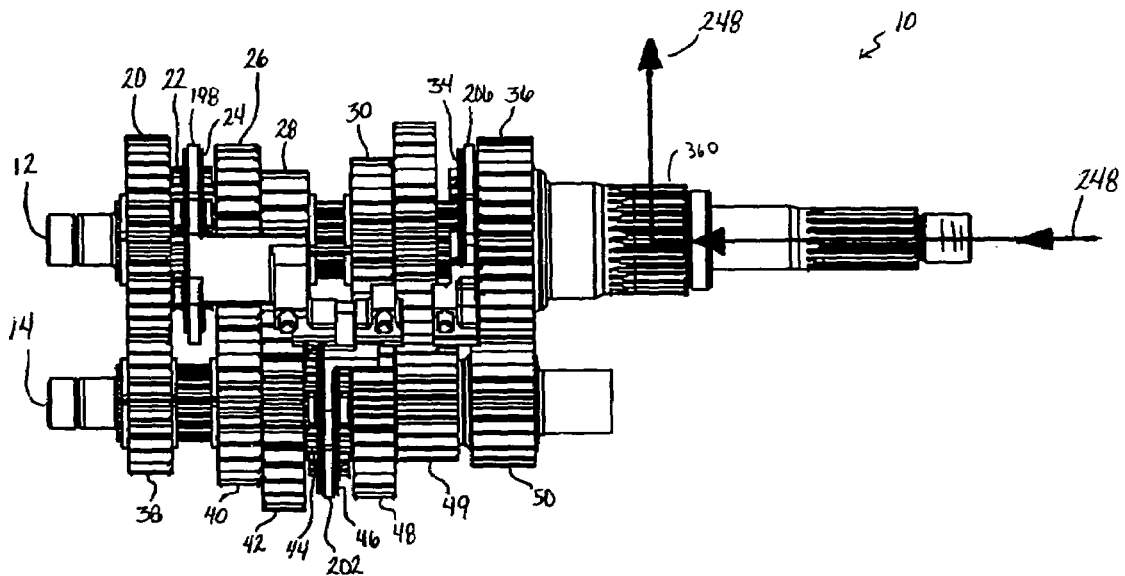
FIG. 19 is a side view of an exemplary six speed gear assembly according to one aspect of the present invention shown in a 5th gear position.

FIG. 19 shows the six speed gear assembly 10 in the 5th gear position. When the six speed gear assembly 10 is in the 5th gear position, 3–4 shift ring 24 and the 1–2 shift ring 46 are each in their neutral positions, while the 5–6 shift ring 34 is engaged with the mainshaft 5th gear 36, which causes the mainshaft 5th gear 36 to be non-rotatably coupled to the mainshaft 12. Regardless that the countershaft 5th gear 50 is non-rotatably coupled to the countershaft 14, torque is not transferred between the mainshaft 12 and the countershaft 14. Torque is transferred from the mainshaft to the 5–6 shift ring 34 to 5th gear 36 as shown by arrow 248. Torque is then transferred from the output gear 360 of the mainshaft 5th gear 36 to the drive belt to drive the rear wheel of the motorcycle.

Figure 20:
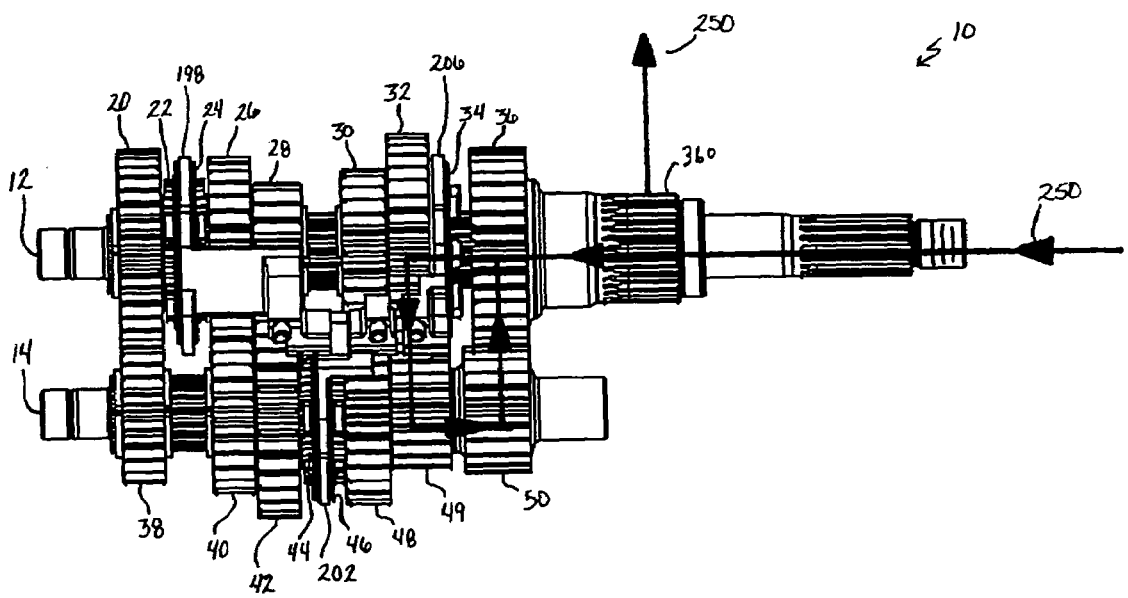
FIG. 20 is a side view of an exemplary six speed gear assembly according to one aspect of the present invention shown in a 6th gear position.

FIG. 20 shows the six speed gear assembly 10 in the 6th gear position. When the six speed gear assembly 10 is in the 6th gear position, 3–4 shift ring 24 and the 1–2 shift ring 46 are each in their neutral positions, while the 5–6 shift ring 34 is engaged with the mainshaft 6th gear 32, which causes the mainshaft 6th gear 32 to be non-rotatably coupled to the mainshaft 12. Since the countershaft 6th gear 49 is non-rotatably coupled to the countershaft 14, torque is transferred between the mainshaft 12 and the countershaft 14 by the mainshaft 6th gear 32 and the countershaft 6th gear 49; and since the countershaft 5th gear 50 is non-rotatably coupled to the countershaft 14, torque is transferred to the mainshaft 5th gear 36 as shown by arrow 250. Torque is then transferred from the output gear 360 of the mainshaft 5th gear 36 to the drive belt to drive the rear wheel of the motorcycle.

Figure 21B:
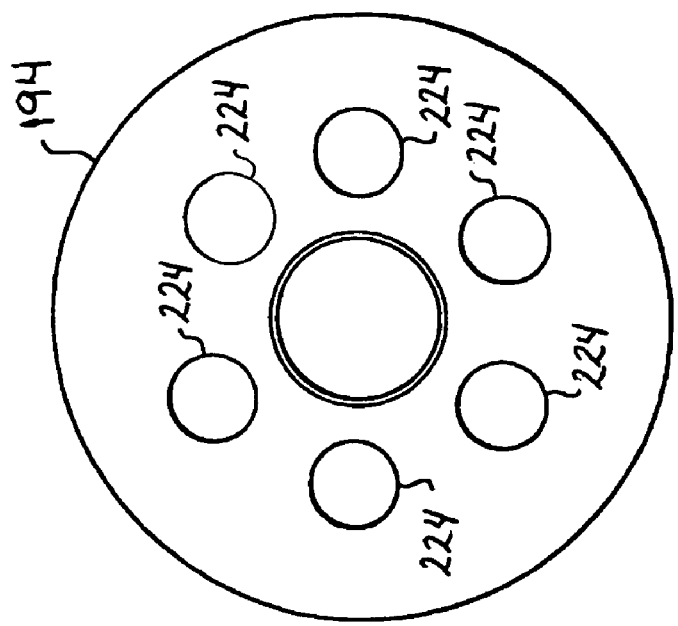
FIG. 21B is a cross-sectional view taken from line 21B—21B of FIG. 10 showing an arrangement of shift pins on a shift drum of the shift assembly.
Figure 21A:
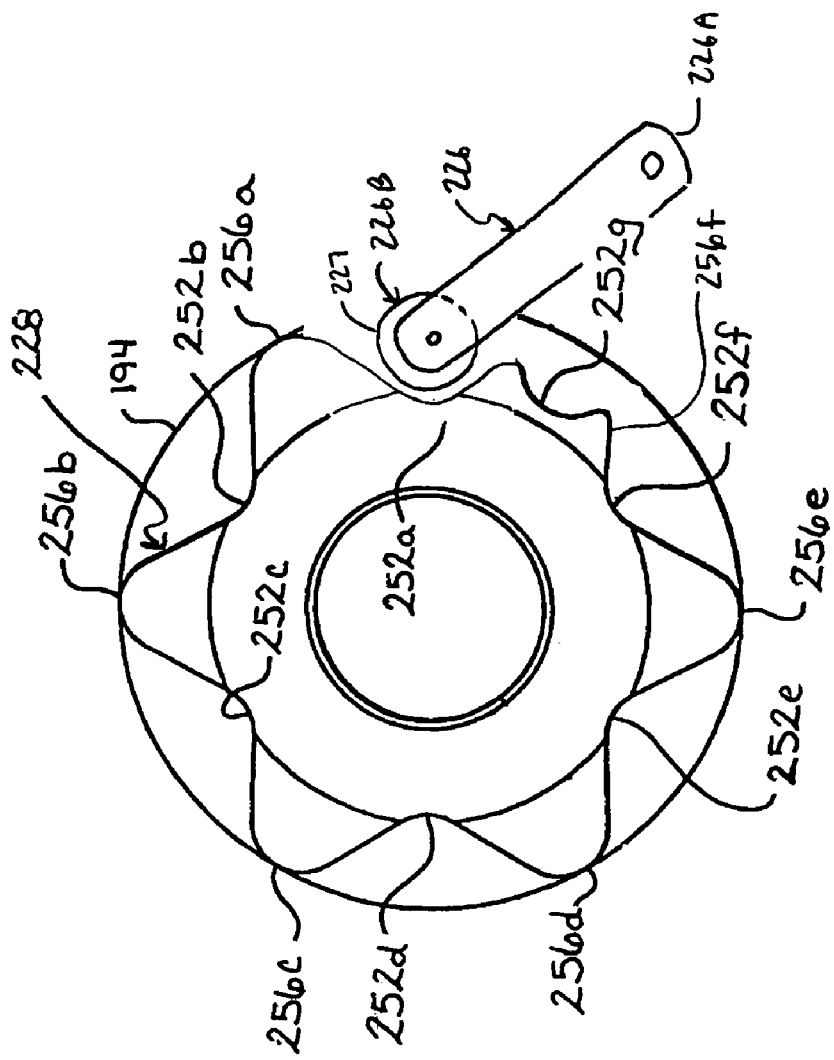
FIG. 21A is a cross-sectional view taken from line 21A—21A of FIG. 10 showing a detent track mounted to a shift drum of the shift assembly.
Figure 21C:
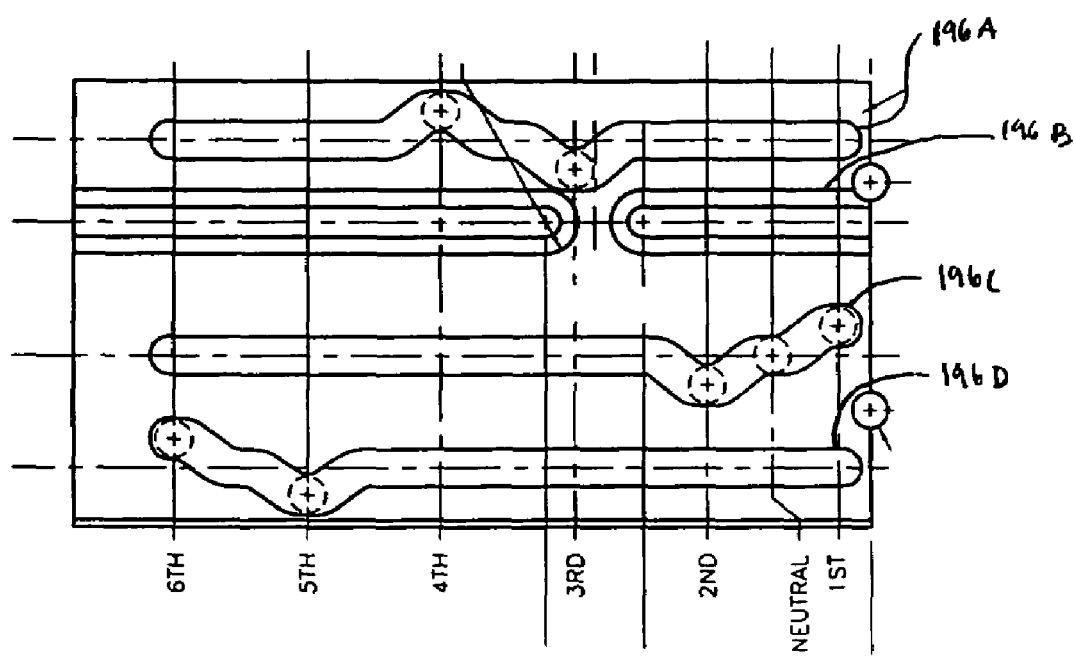
FIG. 21C is a flattened depiction of a cylindrical surface of a shift drum from the shift assembly of FIG. 10.

FIGS. 21A–21C show details of the gear shifting assembly 192. FIG. 21A shows the detent track 228; FIG. 28B shows an arrangement of the shift pins 224 on the shift drum 192; and FIG. 21C shows a flattened depiction of the cylindrical surface of the shift drum 194, including the shift drum grooves 196A–196D.

As shown in FIG. 21A, the detent track 228 has six equally spaced spokes 256a–256f that define six valleys 252a–252f. An indention in the spoke 256f defines a seventh valley 252g. When the shift pawl 258 rotates the shift drum 194 by manipulation of the shift pins 224 as described below, the roller 227 on the second end 226B of the detent follower 226 rides along the spokes 256b–256f and is biased into one of the seven valleys 252a–252g. As such, the shift drum 194 is biased into one of seven predetermined positions corresponding to each of the seven positions of the roller 227 of the detent follower 226.

When the roller 227 is in the valley 252g, the shift forks 198, 202 and 206 are disposed in their corresponding grooves 196A, 196C and 196D, respectively, along the line labeled "Neutral" in FIG. 21C. In this position, none of the shift rings 24, 34 and 46 are engaged with a corresponding six speed gear assembly gear, thus the six speed gear assembly 10 is in the neutral gear position as shown in FIG. 14.

When the roller 227 is in the valley 252a, as shown in FIG. 21A, the shift forks 198, 202 and 206 are disposed in their corresponding grooves are along the line labeled "1st" in FIG. 21C and the 1–2 shift drum groove 196c causes the 1–2 shift fork 202 to move the 1–2 shift ring 46 into engagement with the countershaft 1st gear 42. In this position, the six speed gear assembly 10 is in the 1st gear position as shown in FIG. 15.

When the roller 227 is in the valley 252f, the shift forks 198, 202 and 206 are disposed in their corresponding grooves along the line labeled "2nd" in FIG. 21C and the 1–2 shift drum groove 196c causes the 1–2 shift fork 202 to move the 1–2 shift ring 46 into engagement with the countershaft 2nd gear 48. In this position, the six speed gear assembly 10 is in the 2nd gear position as shown in FIG. 16.

When the roller 227 is in the valley 252e, the shift forks 198, 202 and 206 are disposed in their corresponding grooves along the line labeled "3rd" in FIG. 21C and the 3–4 shift drum groove 196a causes the 3–4 shift fork 198 to move the 3–4 shift ring 24 into engagement with the mainshaft 3rd gear 26. In this position, the six speed gear assembly 10 is in the 3rd gear position as shown in FIG. 17.

When the roller 227 is in the valley 252d, the shift forks 198, 202 and 206 are disposed in their corresponding grooves along the line labeled "4th" in FIG. 21C and the 3–4 shift drum groove 196a causes the 3–4 shift fork 198 to move the 3–4 shift ring 24 into engagement with the mainshaft 4th gear 20. In this position, the six speed gear assembly 10 is in the 4th gear position as shown in FIG. 18.

When the roller 227 is in the valley 252c, the shift forks 198, 202 and 206 are disposed in their corresponding grooves along the line labeled "5th" in FIG. 21C and the 5–6 shift drum groove 196d causes the 5–6 shift fork 206 to move the 5–6 shift ring 34 into engagement with the mainshaft 5th gear 36. In this position, the six speed gear assembly 10 is in the 5th gear position as shown in FIG. 19.

When the roller 227 is in the valley 252b, the shift forks 198, 202 and 206 are disposed in their corresponding grooves along the line labeled "6th" in FIG. 21C and the 5–6 shift drum groove 196d causes the 5–6 shift fork 206 to move the 5–6 shift ring 34 into engagement with the mainshaft 6th gear 32. In this position, the six speed gear assembly 10 is in the 6th gear position as shown in FIG. 20.

Figure 22:
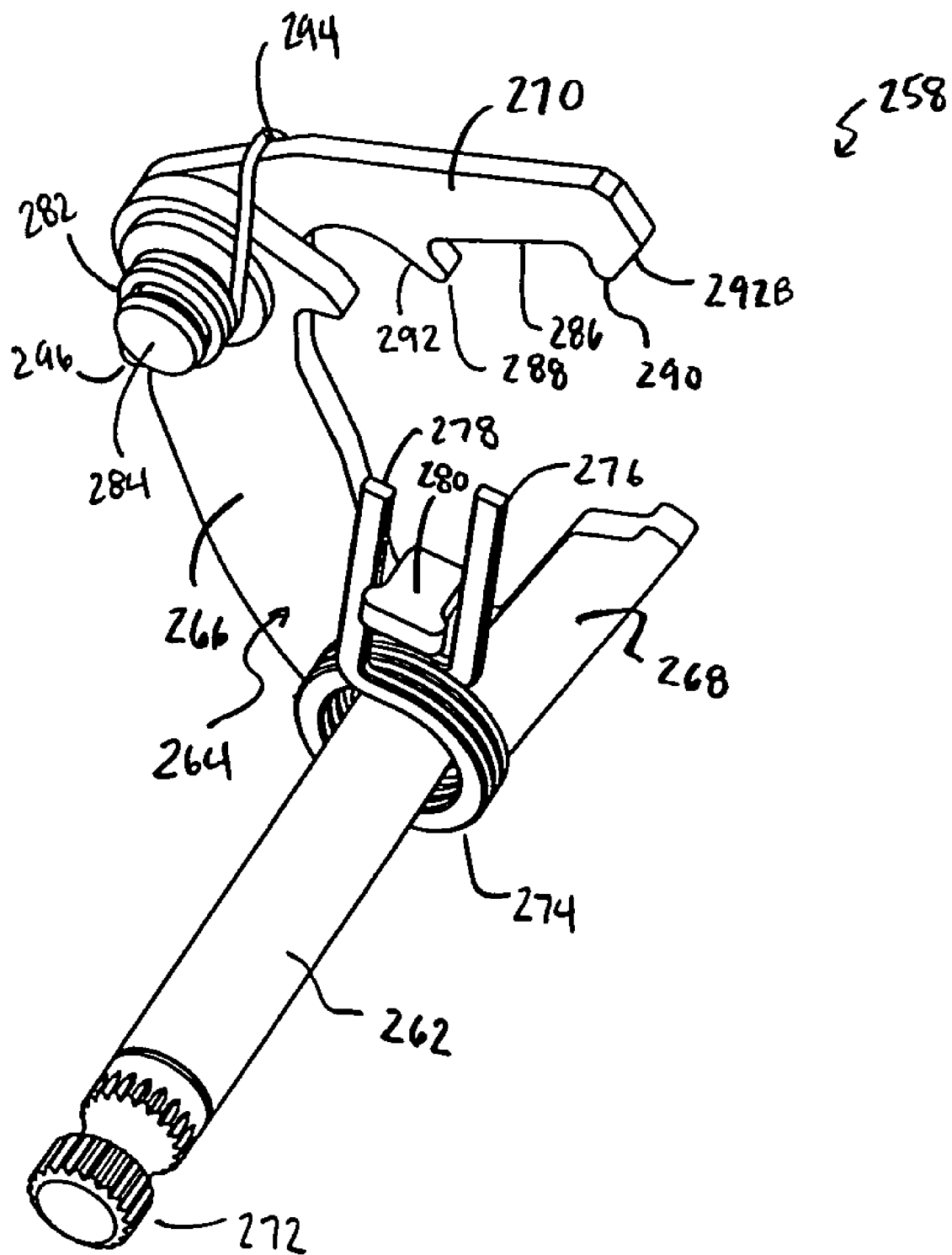
FIG. 22 is a perspective view of an exemplary shift pawl according to another aspect of the present invention.

FIG. 22 shows the shift pawl 258. The shift pawl 258 includes a shifter shaft 262. Attached to the shifter shaft 262 is a main body 264 of the shift pawl 258. The main body 264 extends generally perpendicularly from the shifter shaft 262. The main body 264 includes a shift lever 266 and an over-downshift protection arm 268. Attached to the shift lever 266 is a ratchet arm 270. The ratchet arm 270 includes a recess 286 defined by first and second fingers 288 and 290. The first finger 288 includes a ramped portion 292 and the second finger 290 includes a ramped portion 292B.

A main body torsion spring 274 is mounted around an outer surface of the shifter shaft 262 and has first and second arms 276 and 278 in contact with opposite sides of a spring mounting plate 280. The main body torsion spring 274 resists rotation of the shift pawl 258 in either direction.

A ratchet arm torsion spring 282 is mounted around a mounting pin 284, which rotatably connects the shift lever 266 of the main body 264 to the ratchet arm 270. The ratchet arm torsion spring 282 includes a first arm 294 in contact with the ratchet arm 270 and a second arm 296 in contact with the shift lever 266 of the main body 264. The ratchet arm torsion spring 282 resists rotation of the ratchet arm 270 in a direction away from the main body 264 (the counter-clockwise direction in FIG. 22.)

As shown in FIG. 9, the shifter shaft 262 of the shift pawl 258 is mounted through opening 260 in the side wall 19 of the modified stock transmission case 9' from the cavity 23 area of the transmission case 9' and is rotatably supported by the shifter rod lever 125. For example, in one embodiment, an end of the shifter shaft 262 has external teeth 272 that are engaged by the shifter rod lever 125. The shifter rod lever 125 rotates in response to a motorcycle operator actuating a shift pedal (not shown), which in turn causes a corresponding rotation of the shift pawl 258.

Figure 23A:
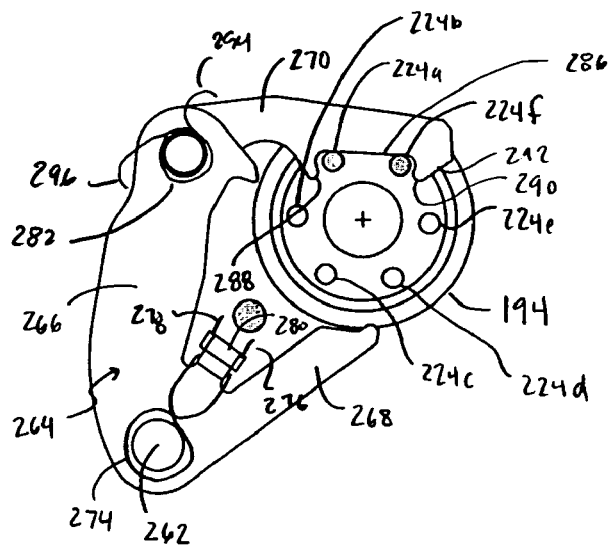
FIGS. 23A–23C shows a side view of the rotation of an exemplary shift drum by the shift pawl of FIG. 22 during three phases of a downshift operation.
Figure 23B:
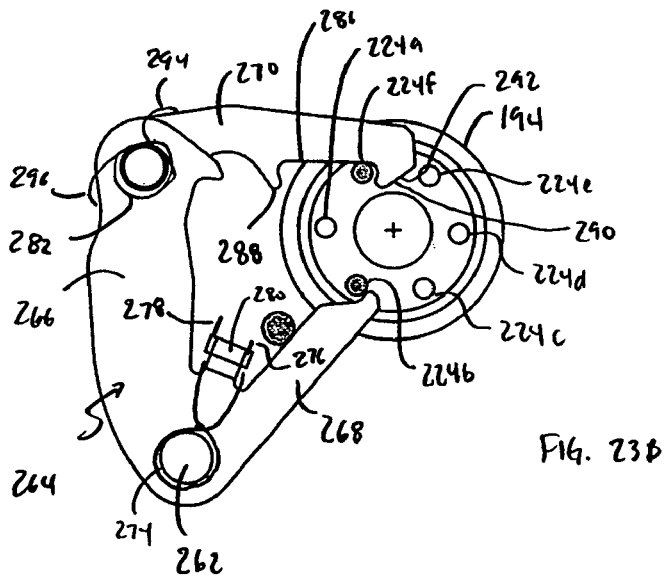
Figure 23C:
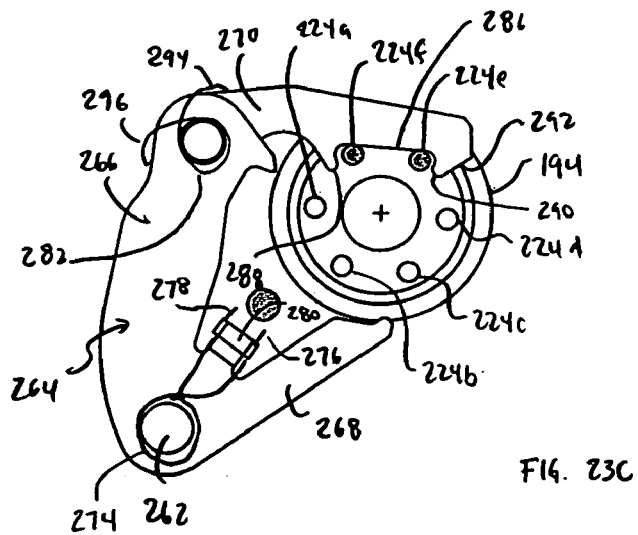

As shown in FIGS. 23A–23C, the ratchet arm 270 is biased into contact with the shift pins 224 (individually labeled in FIGS. 23A–23C as shift pins 224a–224f) such that rotation of the shift pawl 258 causes the ratchet arm 270 to corresponding rotate the shift pins and hence the shift drum 194.

FIGS. 23A–23C illustrate a down-shifting operation of the ratchet arm 270. FIG. 23A illustrates an exemplary position of the shift pawl 258 in a resting state. In this depiction, adjacent shift pins 224a and 224f are disposed in the recess 286 of the ratchet arm 270 and in contact with the first and second fingers 288 and 290, respectively.

During a downshifting operation, the shifter rod lever 125 rotates the shift pawl 258 in a counter-clockwise direction. The causes the ratchet arm 270 to pull shift pin 224f to the left as shown in FIG. 23B, causing a counter-clockwise rotation of the shift drum 194. When the shift drum 194 has rotated sufficient for one full gear change, the over-downshift protection arm 268 contacts shift pin 224b to prevent a further counter-clockwise rotation of the shift drum 194. Thus, the shift drum 194 cannot be over rotated, allowing for downshifting by only one gear.

When the over-downshift protection arm 268 contacts shift pin 224b, the main body torsion spring 274 rotates the shift pawl 258 in a clockwise direction and back into the resting position as shown in FIG. 23C. As the shift pawl 258 is so rotated, the ramped portion 292 of the second finger 290 of the ratchet arm 270 contacts the shift pin 224e allowing the second finger 290 to move over and around the shift pin 224e without rotating the shift drum 194. When the second finger 290 moves past the shift pin 224e, the ratchet arm torsion spring 282 biases the ratchet arm 270 over the shift pin 224e such that the shift pin 224e is disposed with the recess 286 of the ratchet arm 270 and in contact with the second finger 290.

Viewing FIGS. 1 and 9 together, the six speed gear assembly 10 may be retrofitted to a stock five speed transmission case 9 by removing the stock trapdoor 21 from the stock five speed transmission case 9; securing the six speed gear assembly 10 to the trapdoor 130; and securing the trapdoor 130 to the stock five speed transmission case 9. The end cover 186 may be secured to the trapdoor 130 as described above. The shifting assembly 192 or a conventional shifting assembly 75 may be attached to the top surface 89 of the central portion 13 of the transmission case 9. If the 3–4 shift fork 198 is used, the shift fork shaft mounting flange 101 must be removed from the stock five speed transmission case 9, forming the modified stock transmission case 9' of FIG. 9, which allows for the appropriate axial movement of the 3–4 shift fork 198 relative to the six speed gear assembly 10. The ratchet arm 270 or the conventional ratchet arm 127 may be attached to the selected shifting assembly 192 or 75 to cause rotations of the selected shift drum 194 or 77.

Alternatively, the six speed gear assembly 10 may be secured to the trapdoor 130 or to a conventional trapdoor, such as trapdoor 21; and secured with the selected trapdoor 130 or 21 to a new transmission case (not shown), which may be larger than or substantially the same size as the stock five speed transmission case 9. The end cover 186 or a conventional end cover (not shown) may be secured to the selected trapdoor 130 or 21. The shifting assembly 192 or a conventional shifting assembly 75 may be attached to a top surface of a central portion of the new transmission case. The ratchet arm 270 or the conventional ratchet arm 127 may be attached to the selected shifting assembly 192 or 75 to cause rotations of the selected shift drum 194 or 77.

The preceding description has been presented with references to presently preferred embodiments of the invention. Persons skilled in the art and technology to which this invention pertains will appreciate that alterations and changes in the described structures and methods of operation can be practiced without meaningfully departing from the principle, spirit and scope of this invention. Accordingly, the foregoing description should not be read as pertaining only to the precise structures described and shown in the accompanying drawings.

What is claimed is:

1. A six speed gear assembly for a motorcycle transmission comprising:
   a mainshaft gear shaft;
   a plurality of mainshaft gears mounted in sequence on the mainshaft and comprising:
      a mainshaft 4th gear,
      a mainshaft 3rd gear,
      a gear chosen from the group consisting of a mainshaft 1st gear and a mainshaft 2nd gear,
      a remaining gear from the group consisting of the mainshaft 1st gear and the mainshaft 2nd gear, a mainshaft 6th gear, and
a mainshaft 5th gear, wherein respective gear diameter of the mainshaft gears successively increases from mainshaft 1st gear to mainshaft 2nd gear to mainshaft 3rd gear to mainshaft 4th gear to mainshaft 5th gear to mainshaft 6th gear;
a countershaft gear shaft; and
a plurality of countershaft gears mounted in sequence on the countershaft and comprising:
a countershaft 4th gear,
a countershaft 3rd gear,
a gear chosen from the group consisting of a countershaft 1st gear and a countershaft 2nd gear,
a remaining gear from the group consisting of the countershaft 1st gear and the countershaft 2nd gear,
a countershaft 6th gear, and
a countershaft 5th gear, wherein respective gear diameter of the countershaft gears successively increases from countershaft 6th gear to countershaft 5th gear to countershaft 4th gear to countershafi 3rd gear to countershaft 2nd gear to countershaft 1st gear.

2. The six speed gear assembly of claim 1, wherein each mainshaft gear is axially restrained relative to the mainshaft and wherein each countershaft gear is axially restrained relative to the countershaft.

3. The six speed gear assembly of claim 2, wherein each mainshaft gear meshes in 100% gear mesh engagement with a corresponding countershaft gear.

4. The six speed gear assembly of claim 1, wherein each mainshaft gear meshes with a corresponding countershaft gear to form a plurality of gear couplings, and wherein one of the gears from each gear coupling is rotatably coupled to its corresponding gear shaft and the remaining gear from each gear coupling is non-rotatably coupled to its corresponding gear shaft.

5. The six speed gear assembly of claim 4, wherein each rotatably coupled gear is removably engaged by a corresponding one of a plurality of shift rings, and wherein each shift ring is non-rotatably coupled to a corresponding one of the gear shafts.

6. The six speed gear assembly of claim 4, wherein each rotatably coupled gear comprises pockets that are removably engaged by dogs that protrude from a corresponding one of a plurality of shift rings, and wherein each shift ring is non-rotatably coupled to a corresponding one of the gear shafts.

7. The six speed gear assembly of claim 5, wherein each shift ring is disposed between a corresponding pair of the rotatably coupled gears.

8. The six speed gear assembly of claim 7, wherein each shift ring is axially movable relative to its corresponding gear shaft to selectively engage a desired one of the gears in its corresponding rotatably coupled gear pair.

9. The six speed gear assembly of claim 7, wherein each shift ring is axially movable relative to its corresponding gear shaft and comprises a body having a first plurality of dogs protruding from a first side of its body to selectively engage the pockets of one of the gears in its corresponding rotatably coupled gear pair and a second plurality of dogs protruding from a second side of its body to selectively engage the pockets of the remaining gear in its corresponding rotatably coupled gear pair.

10. A six speed gear assembly for a motorcycle transmission comprising:
a mainshaft gear shaft;
a plurality of mainshaft gears mounted on the mainshaft and comprising 1st, 2nd, 3rd, 4th, 5th and mainshaft 6th gears;
a countershaft gear shaft;
a plurality of countershaft gears mounted on the countershaft and comprising 1st, 2nd, 3rd, 4th, 5th and countershaft 6th gears; and
wherein each mainshaft gear meshes with a corresponding countershaft gear to form a plurality of gear couplings, the gear couplings having respective gear ratios which successively increase from the 1st gear coupling to the 2nd gear coupling to the 3rd gear coupling to the 4th gear coupling to the 5th gear coupling to the 6th gear coupling;
wherein one of the gears from each gear coupling is rotatably coupled to its corresponding gear shaft and the remaining gear from each gear coupling is non-rotatably coupled to its corresponding gear shaft; and
wherein each rotatably coupled gear is removably engaged by one of a plurality of shift rings, each shift ring forming an independent component of the motorcycle transmission.

11. The six speed gear assembly of claim 10, wherein each shift ring is non-rotatably coupled to a corresponding one of the gear shafts.

12. The six speed gear assembly of claim 11, wherein each rotatably coupled gear comprises pockets that are removably engaged by dogs that protrude from one of the plurality of shift rings.

13. The six speed gear assembly of claim 11, wherein each shift ring is disposed between a corresponding pair of the rotatably coupled gears.

14. The six speed gear assembly of claim 13, wherein each shift ring is axially movable relative to its corresponding gear shaft to selectively engage a desired one of the gears in its corresponding rotatably coupled gear pair.

15. The six speed gear assembly of claim 13, wherein each shift ring is axially movable relative to its corresponding gear shaft and comprises a body having a first plurality of dogs protruding from a first side of its body to selectively engage the pockets of one of the gears in its corresponding rotatably coupled gear pair and a second plurality of dogs protruding from a second side of its body to selectively engage the pockets of the remaining gear in its corresponding rotatably coupled gear pair.

16. The six speed gear assembly of claim 11, wherein each mainshaft gear is axially restrained relative to the mainshaft and wherein each countershaft gear is axially restrained relative to the countershaft.

17. The six speed gear assembly of claim 16, wherein each mainshaft gear meshes in 100% gear mesh engagement with a corresponding countershaft gear.

18. A method of retrofitting a six speed motorcycle transmission to a five speed transmission case, wherein the case comprises a central portion, a first side wall adjacent to a first side of the central portion, and a trapdoor adjacent to a second side of the central portion, wherein the central portion comprises a top surface and a central portion opening, the method comprising:
removing the trapdoor;
providing a six speed gear assembly comprising a mainshaft gear shaft and a countershaft gear shaft;
mounting a plurality of mainshaft gears on the mainshaft, wherein the plurality of mainshaft gears comprises mainshaft 1st, 2nd, 3rd, 4th, 5th and 6th gears;
mounting a plurality of countershaft gears on the countershaft, wherein the plurality of countershaft gears comprises countershaft 1st, 2nd, 3rd, 4th, 5th and 6th gears, wherein each mainshaft gear meshes with a corresponding countershaft gear to form a plurality of gear couplings;

securing the six speed gear assembly to a replacement trapdoor, the replacement trapdoor comprising a recess that receives at least a portion of the thickness of one of the gear couplings; and securing the replacement trapdoor and the six speed gear assembly to the stock case.

19. The method of claim 18, wherein the six speed gear assembly is secured to the replacement trapdoor, such that the recess of the replacement trapdoor receives at least a majority of the thickness of one of the gear couplings.

20. The method of claim 18, wherein the mainshaft 4th gear meshes with the countershaft 4th gear to form one of the plurality of gear couplings and wherein the six speed gear assembly is secured to the replacement trapdoor, such that the recess of the replacement trapdoor receives at least a portion of the thickness of each of the mainshaft 4th gear and the countershaft 4th gear.

21. The method of claim 20, further comprising mounting a speedo sensor to the trapdoor in close proximity to the mainshaft 4th gear.

22. The method of claim 18, wherein the mainshaft 4th gear meshes with the countershaft 4th gear to form one of the plurality of gear couplings and wherein the six speed gear assembly is secured to the replacement trapdoor, such that the recess of the replacement trapdoor receives at least a majority of the thickness of each of the mainshaft 4th gear and the countershaft 4th gear.

23. The method of claim 18, wherein mounting the plurality of mainshaft gears on the mainshaft gear shaft comprises mounting each mainshaft gear such that each mainshaft gear is axially restrained relative to the mainshaft gear shaft and wherein mounting the plurality of countershaft gears on the countershaft gear shaft comprises mounting each countershaft gear such that each countershaft gear is axially restrained relative to the countershaft gear shaft.

24. The method of claim 18, wherein each of the plurality of gear couplings meshes in 100% gear mesh engagement.

25. The method of claim 18, wherein one of the gears from each gear coupling is rotatably coupled to its corresponding gear shaft and the remaining gear from each gear coupling is non-rotatably coupled to its corresponding gear shaft.

26. The method of claim 25, wherein each rotatably coupled gear is removably engaged by a corresponding one of a plurality of shift rings, and wherein each shift ring is non-rotatably coupled to a corresponding one of the gear shafts.

27. The method of claim 25, wherein each rotatably coupled gear comprises pockets that are removably engaged by dogs that protrude from a corresponding one of a plurality of shift rings, and wherein each shift ring is non-rotatably coupled to a corresponding one of the gear shafts.

28. The method of claim 26, wherein each shift ring is disposed between a corresponding pair of the rotatably coupled gears.

29. The method of claim 28, wherein each shift ring is axially movable relative to its corresponding gear shaft to selectively engage a desired one of the gears in its corresponding rotatably coupled gear pair.

30. The method of claim 28, wherein each shift ring is axially movable relative to its corresponding gear shaft and comprises a body having a first plurality of dogs protruding from a first side of its body to selectively engage the pockets of one of the gears in its corresponding rotatably coupled gear pair and a second plurality of dogs protruding from a second side of its body to selectively engage the pockets of the remaining gear in its corresponding rotatably coupled gear pair.

31. The method of claim 18, further comprising:

mounting a 3–4 shift ring on a corresponding one of the gear shafts and disposing the 3–4 shift ring between one of the gear couplings chosen from the group consisting of the 4th and mainshaft 3rd gears and the 4th and countershaft 3rd gears, such that that the 3–4 shift ring selectively engages a desired one of the gear couplings chosen from the group consisting of the 4th and mainshaft 3rd gears and the 4th and countershaft 3rd gears; and providing a 3–4 shift fork comprising a fork arm that engages a groove in the 3–4shift ring to axially move the 3–4 shift ring relative to its corresponding gear shaft, wherein the 3–4 shift fork comprises an arm connected to the fork arm and extending across at least two gears of a corresponding gear shaft.

32. The method of claim 18, further comprising:

mounting a shift ring on a corresponding one of the gear shafts and disposing the shift ring between two of the gear couplings such that the shift ring is selectively engagable to a desired one of the two gear couplings; and mounting a shift fork on the shift ring such that a fork arm engages a groove in the shift ring to axially move the shift ring relative to its corresponding gear shaft, wherein the shift fork comprises an arm connected to the fork arm that extends across at least two gears of a corresponding gear shaft.

33. The method of claim 18, further comprising:

mounting a shifting assembly to the top surface of the central portion of the transmission case;

mounting a shift ring to the shifting assembly, wherein the shift ring comprising a fork arm, and an elongated arm extending generally perpendicularly from the fork arm, wherein when the fork arm is disposed in close proximity to the replacement trapdoor, the elongated arm extends over at least two gears of a corresponding gear shaft, while a pin extends from the fork arm, through the central portion opening and into engagement with a recessed groove in a shift drum of the shifting assembly.

34. The method of claim 18, further comprising:

providing a replacement end cover having a recess;

forming a protrusion that extends from a portion of the replacement trapdoor;

inserting the protrusion of the replacement trapdoor into the recess of the cover such that a rotation movement of the replacement end cover relative to the replacement trapdoor is prevented.

35. The method of claim 18, further comprising:

mounting the plurality of mainshaft gears on the mainshaft gear shaft in a sequence that comprises:

the mainshaft 4th gear, the mainshaft 3rd gear, a gear chosen from the group consisting of the mainshaft 1st gear and the mainshaft 2nd gear, a remaining gear from the group consisting of the mainshaft 1st gear and the mainshaft 2nd gear,
the mainshaft 6th gear, and
the mainshaft 5th gear; and
mounting the plurality of countershaft gears on the countershaft gear shaft in a sequence that comprises:
the countershaft 4th gear;
the countershaft 3rd gear;
a gear chosen from the group consisting of the countershaft 1st gear and the countershaft 2nd gear;
a remaining gear from the group consisting of the countershaft 1st gear and the countershaft 2nd gear;
the countershaft 6th gear; and
the countershaft 5th gear.

36. The method of claim 18, wherein the case further comprises a shift fork shaft mounting flange for mountingly receiving a shift fork shaft of a shifting assembly, the method further comprising removing the shift fork shaft mounting flange.

37. The method of claim 36, further comprising:
forming a shift fork shaft opening in the replacement trapdoor;
providing a shift fork shaft; and
mounting an end of a shift fork shaft in the shift fork shaft opening of the replacement trapdoor.

38. The method of claim 18, wherein the case further comprises a shift pawl, the method further comprising:
removing the shift pawl;
mounting a replacement shift pawl to a shifting assembly that comprises a shift drum having a plurality of shift pins, such that movements of the shift pins causes up shifting and downshifting of the gears, wherein the shift pawl comprises a ratchet arm connected to at least one of the shift pins for causing the up-shifting and a down-shifting of the gears, and wherein the shift pawl further comprises a second arm that prevents the ratchet arm from down shifting by more than one gear.

39. The method of claim 38, wherein the second arm is an over-downshift protection arm.

40. The method of claim 18, wherein the six speed motorcycle transmission is retrofitted to the five speed transmission case without modifying an overall length of the five speed transmission case.

41. A trapdoor for retrofitting to a five speed transmission case, the trapdoor comprising:
a trapdoor base; and
a recess in the trapdoor base for receiving at least a portion of the thickness of a gear from a six speed gear assembly, the six speed gear assembly comprising:
a mainshaft 1st gear, a mainshaft 2nd gear, a mainshaft 3rd gear, a mainshaft 4th gear, a mainshaft 5th gear, and a mainshaft 6th gear, wherein respective gear diameter of the mainshaft gears successively increases from mainshaft 1st gear to mainshaft 2nd gear to mainshaft 3rd gear to mainshaft 4th gear to mainshaft 5th gear to mainshaft 6th gear; and
a countershaft 1st gear, a countershaft 2nd gear, a countershaft 3rd gear, a countershaft 4th gear, a countershaft 5th gear, and a countershaft 6th gear, wherein respective gear diameter of the mainshaft gears successively increases from countershaft 6th gear to countershaft 5th gear to countershaft 4th gear to countershaft 3rd gear to countershaft 2nd gear to countershaft 1st gear.

42. The trapdoor of claim 41, wherein said gear from the six speed gear assembly that is received by the recess of the trapdoor is the mainshaft 4th gear.

43. The trapdoor of claim 41, wherein the recess of the trapdoor comprises a length sufficient for receiving the length of a meshed gear coupling from the six speed gear assembly.

44. The trapdoor of claim 43, wherein said meshed gear coupling from the six speed gear assembly that is received by the length of the recess of the trapdoor is a meshed gear coupling of the mainshaft 4th gear and the countershaft 4th gear.

45. The trapdoor of claim 41, further comprising a protrusion extending from the trapdoor base for engagement with a recess in an end cover, such that when the protrusion of the trapdoor is inserted into the recess of the end cover, a rotational movement of the trapdoor relative to the end cover is prevented.

46. A trapdoor for a motorcycle transmission comprising:
a trapdoor base; and
a recess in the trapdoor base for receiving at least a portion of the thickness of a gear from a transmission gear assembly, the transmission gear assembly comprising:
a mainshaft 1st gear, a mainshaft 2nd gear, a mainshaft 3rd gear, a mainshaft 4th gear, a mainshaft 5th gear, and a mainshaft 6th gear, wherein respective gear diameter of the mainshaft gears successively increases from mainshaft 1st gear to mainshaft 2nd gear to mainshaft 3rd gear to mainshaft 4th gear to mainshaft 5th gear to mainshaft 6th gear; and
a countershaft 1st gear, a countershaft 2nd gear, a countershaft 3rd gear, a countershaft 4th gear, a countershaft 5th gear, and a countershaft 6th gear, wherein respective gear diameter of the mainshaft gears successively increases from countershaft 6th gear to countershaft 5th gear to countershaft 4th gear to countershaft 3rd gear to countershaft 2nd gear to countershaft 1st gear.

47. The trapdoor of claim 46, wherein said gear from the transmission gear assembly that is received by the recess of the trapdoor is the mainshaft 4th gear.

48. The trapdoor of claim 46, wherein the recess of the trapdoor comprises a length sufficient for receiving the length of a meshed gear coupling from the transmission gear assembly.

49. The trapdoor of claim 48, wherein said meshed gear coupling from the transmission gear assembly that is received by the length of the recess of the trapdoor is a meshed coupling of the mainshaft 4th gear and the countershaft 4th gear.

50. The trapdoor of claim 46, further comprising a protrusion extending from the trapdoor base for engagement with a recess in an end cover, such that when the protrusion of the trapdoor is inserted into the recess of the end cover, a rotational movement of the trapdoor relative to the end cover is prevented.

51. A trapdoor and end cover combination for a motorcycle transmission comprising:
a trapdoor base having a protrusion extending therefrom; and
an end cover base having a recess formed therein, wherein the protrusion of the trapdoor mates with the recess in the end cover to prevent a rotational movement of the trapdoor relative to the end cover.

52. A transmission assembly comprising:
a six speed gear assembly comprising a mainshaft gear shaft and a countershaft gear shaft;
a plurality of mainshaft gears mounted on the mainshaft, wherein the plurality of mainshaft gears comprises mainshaft 1st, 2nd, 3rd, 4th, 5th and 6th gears, and wherein respective gear diameter of the mainshaft gears successively increases from mainshaft 1st gear to mainshaft 2nd gear to mainshaft 3rd gear to mainshaft 4th gear to mainshaft 5th gear to mainshaft 6th gear;

a plurality of countershaft gears mounted on the countershaft, wherein the plurality of countershaft gears comprises countershaft 1st, 2nd, 3rd, 4th, 5th and 6th gears, wherein respective gear diameter of the countershaft gears successively increases from countershaft 6th gear to countershaft 5th gear to countershaft 4th gear to countershaft 3rd gear to countershaft 2nd gear to countershaft 1st gear, and wherein a mainshaft gear meshes with a corresponding countershaft gear to form a gear coupling; and a trapdoor comprising a recess that receives at least a portion of the thickness of one of the gears.

53. The transmission assembly of claim 52, wherein the recess receives at least a majority of the thickness of one of the gears.

54. The transmission assembly of claim 52, wherein the mainshaft 4th gear meshes with the countershaft 4th gear to form said gear coupling and wherein the recess of the trapdoor receives at least a portion of the thickness of the mainshaft 4th gear.

55. The transmission assembly of claim 54, further comprising a speedo sensor mounted within the recess of the trapdoor and in close proximity to the mainshaft 4th gear.

56. The transmission assembly of claim 52, wherein the mainshaft 4th gear meshes with the countershaft 4th gear to form said gear coupling and wherein the recess of the trapdoor receives at least a majority of the thickness of the mainshaft 4th gear.

* * * * *

UNITED STATES PATENT AND TRADEMARK OFFICE
CERTIFICATE OF CORRECTION

| | | |
|---|---|---|
| PATENT NO. | : 7,059,210 B2 | Page 1 of 2 |
| APPLICATION NO. | : 10/764086 | |
| DATED | : June 13, 2006 | |
| INVENTOR(S) | : Thiessen et al. | |

It is certified that error appears in the above-identified patent and that said Letters Patent is hereby corrected as shown below:

On the Title Page

(75) Inventors    Delete "David J. Whitaker",
           Insert --David K. Whitaker--

In the Specification

Column 1, line 16    Delete "replace the it",
           Insert --replace it--

Column 1, line 50    Delete "countershaft 1st countershaft 1st",
           Insert --countershaft 1st--

Column 4, line 21    Delete "is directly",
           Insert --is directed--

Column 9, line 42    Delete "14.).",
           Insert --14).--

Column 9, line 48    Delete "14.).",
           Insert --14).--

Column 13, line 59   Delete "may any",
           Insert --may be any--

Column 14, line 18   Delete "the fasteners",
           Insert --the fastener--

Column 14, line 19   Delete "the fasteners",
           Insert --the fastener--

Column 14, line 40   Delete "includes and a",
           Insert --includes a--

Column 18, line 35   Delete "are along",
           Insert --along--

Column 19, line 48   Delete "corresponding"

Column 19, line 58   Delete "The causes",
           Insert --This causes--

UNITED STATES PATENT AND TRADEMARK OFFICE
CERTIFICATE OF CORRECTION

PATENT NO. : 7,059,210 B2
APPLICATION NO. : 10/764086
DATED : June 13, 2006
INVENTOR(S) : Thiessen et al.

Page 2 of 2

It is certified that error appears in the above-identified patent and that said Letters Patent is hereby corrected as shown below:

In the Claims

| | |
|---|---|
| Column 21, line 20, Claim 1 | Delete "countershafi", Insert --countershaft-- |
| Column 24, line 17, Claim 31 | Delete "3-4shift", Insert --3-4 shift-- |
| Column 24, line 38, Claim 33 | Delete "comprising", Insert --comprises-- |
| Column 24, line 50, Claim 34 | After "trapdoor;", Insert --and-- |
| Column 25, line 31, Claim 38 | Delete "pins causes", Insert --pins cause-- |

Signed and Sealed this

Twenty-second Day of May, 2007

JON W. DUDAS
*Director of the United States Patent and Trademark Office*